United States Patent
Yoo et al.

(10) Patent No.: US 10,141,963 B2
(45) Date of Patent: Nov. 27, 2018

(54) OPERATING METHOD OF RECEIVER, SOURCE DRIVER AND DISPLAY DRIVING CIRCUIT INCLUDING THE SAME

(71) Applicant: SAMSUNG ELECTRONICS CO., LTD., Suwon-si, Gyeonggi-do (KR)

(72) Inventors: Kwi-Sung Yoo, Seoul (KR); Jae-Youl Lee, Hwaseoung-si (KR); Hyun-Wook Lim, Seoul (KR); Young-Min Choi, Yongin-si (KR); Dong-Hoon Baek, Seoul (KR); Kyong-Ho Kim, Hwaseong-si (KR); Eun-Young Jin, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/266,505

(22) Filed: Sep. 15, 2016

(65) Prior Publication Data

US 2017/0111071 A1  Apr. 20, 2017

(30) Foreign Application Priority Data

Oct. 16, 2015 (KR) .......................... 10-2015-0144742

(51) Int. Cl.
*H04B 1/12* (2006.01)
*H04L 25/03* (2006.01)
*H04L 12/26* (2006.01)

(52) U.S. Cl.
CPC ....... *H04B 1/123* (2013.01); *H04L 25/03146* (2013.01); *H04L 25/03878* (2013.01); *H04L 43/16* (2013.01); *H04L 2025/03764* (2013.01)

(58) Field of Classification Search
CPC . H04B 1/10; H04B 1/123; H04B 1/16; H04B 1/1615; H04B 1/40; H04B 1/401; H04B 1/48; H04L 25/026; H04L 25/0264; H04L 25/0272; H04L 25/03146; H04L 25/03267; H04L 25/03273; H04L 43/16; H04L 2025/03764; H04L 2025/03815; H04L 25/0387; H04L 2025/038158
USPC .... 375/219, 220, 222, 232, 233, 257; 307/2, 307/22, 26, 128
See application file for complete search history.

(56) References Cited

U.S. PATENT DOCUMENTS

| | | | |
|---|---|---|---|
| 4,491,834 A | 1/1985 | Oguchi | |
| 5,091,723 A | 2/1992 | Kanno et al. | |
| 5,095,835 A * | 3/1992 | Jernigan | ............... D05B 19/08 112/103 |
| 5,298,912 A | 3/1994 | Mano et al. | |
| 6,151,007 A | 11/2000 | Kasai et al. | |
| 6,414,659 B1 | 7/2002 | Park et al. | |
| 7,447,379 B2 | 11/2008 | Choe et al. | |
| 7,529,406 B2 | 5/2009 | Kao et al. | |
| 8,441,506 B2 | 5/2013 | Lee et al. | |

(Continued)

*Primary Examiner* — Young T Tse

(74) *Attorney, Agent, or Firm* — F. Chau & Associates, LLC

(57) ABSTRACT

A method of operating a receiver includes a controller of the receiver determining whether a full initialization or a partial initialization of the receiver is needed; the controller adjusting alternating current (AC) characteristics and direct current (DC) characteristics of the receiver in a full initialization mode, and the controller adjusting the DC characteristics of the receiver in a partial initialization mode when the controller determines the partial initialization is needed.

17 Claims, 28 Drawing Sheets

(56) References Cited

U.S. PATENT DOCUMENTS

| | | | |
|---|---|---|---|
| 9,312,874 B1* | 4/2016 | Kakolaki | H03M 7/30 |
| 2005/0040864 A1* | 2/2005 | Ficken | H03K 5/08 |
| | | | 327/65 |
| 2005/0076254 A1* | 4/2005 | Robinson | G06F 1/3209 |
| | | | 713/320 |
| 2005/0281343 A1* | 12/2005 | Hsu | H04L 25/03057 |
| | | | 375/257 |
| 2006/0067440 A1* | 3/2006 | Hsu | H03F 1/3241 |
| | | | 375/345 |
| 2006/0227127 A1 | 10/2006 | Wang et al. | |
| 2008/0117162 A1 | 5/2008 | Song et al. | |
| 2010/0129072 A1* | 5/2010 | Yoshiuchi | H04B 10/6911 |
| | | | 398/17 |
| 2014/0062983 A1 | 3/2014 | Kim et al. | |
| 2015/0042631 A1 | 2/2015 | Kim et al. | |
| 2016/0216317 A1* | 7/2016 | Chen | H04B 17/29 |
| 2017/0132966 A1* | 5/2017 | Lim | G09G 3/2092 |

\* cited by examiner

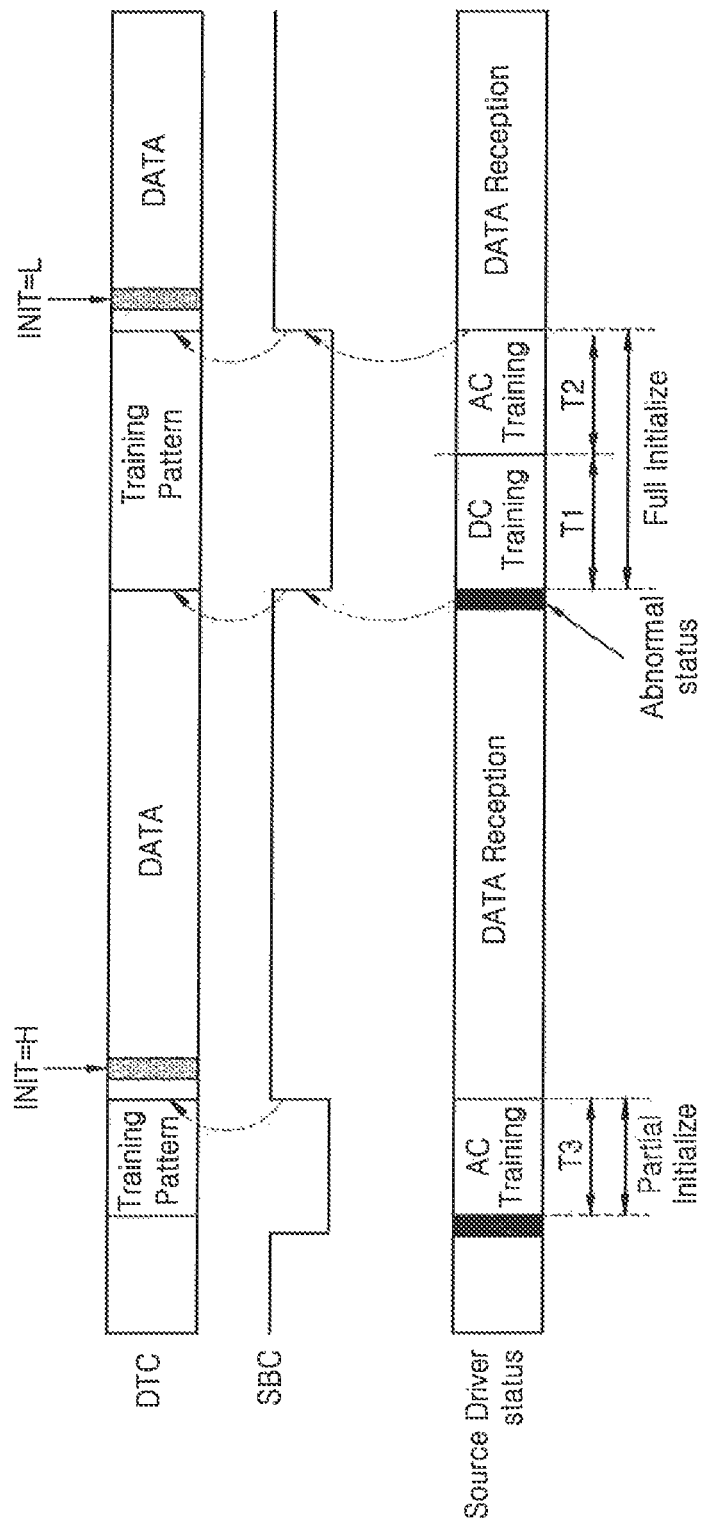

OPERATING METHOD OF RECEIVER, SOURCE DRIVER AND DISPLAY DRIVING CIRCUIT INCLUDING THE SAME

CROSS-REFERENCE TO RELATED APPLICATION

This application claims priority under 35 U.S.C. § 119(a) to Korean Patent Application No. 10-2015-0144742, filed on Oct. 16, 2015, in the Korean Intellectual Property Office, the disclosure of which is incorporated by reference in its entirety herein.

BACKGROUND

1. Technical Field

The inventive concept relates to a display driving circuit, and more particularly, to method of operating a receiver for selectively performing initialization, a source driver, and a display driving circuit including the source driver.

2. Discussion of Related Art

Display resolution is the number of distinct pixels in each dimension that can be displayed. Color depth is either the number of bits used to indicate the color of a single pixel or the number of bits used for each color component of a single pixel. Display driving circuits are used to control a display panel of a display device. The display driving circuits may transmit data to one another while they are controlling the display panel. As the resolution and the color depth of the display panel increases, a data transmission speed between the display driving circuits increases. However, when the transmission speed is excessive, degradation of a signal gain may occur in a data transmission channel. Thus, there is a need for a technology that compensates for the degradation of the signal gain and that does not lower an operation speed of the display device.

SUMMARY

At least one embodiment of the inventive concept provides a method of operating a receiver that performs initialization to compensate for degradation of a gain of a received signal.

At least one embodiment of the inventive concept also provides a source driver that compensates for degradation of a gain of a signal received from a timing controller and does not lower an operation speed of a display device.

At least one embodiment of the inventive concept also provides a display driving circuit including the source driver.

According to an exemplary embodiment of the inventive concept, there is provided an operating method of a receiver. The method includes a controller of the receiver determining whether a full initialization or a partial initialization of the receiver is needed; the controller adjusting alternating current (AC) characteristics and direct current (DC) characteristics of the receiver in a full initialization mode when the controller determines the full initialization is needed; and the controller adjusting the DC characteristics of the receiver in a partial initialization mode when the controller determines the partial initialization is needed.

According to an exemplary embodiment of the inventive concept, there is provided a source driver including: a receiver configured to receive data from an external timing controller and selectively perform initialization according to one selected from a partial initialization mode and a full initialization mode; and a driver configured to convert the received data into a driving signal and drive a display panel based on the driving signal.

According to an exemplary embodiment of the inventive concept, there is provided a display driving circuit including: a timing controller configured to provide display data; and a plurality of source drivers configured to receive the display data through different signal lines, wherein each of the plurality of source drivers includes a receiver for receiving the display data and selectively initializes the receiver according to one selected from a full initialization mode and a partial initialization mode.

According to an exemplary embodiment of the inventive concept, there is provided a display driving circuit including: a timing controller configured to provide display data; and a source driver including a receiver configured to receive the display data and a controller configured to determine whether a soft failure has occurred in the receiver. The controller performs alternating current (AC) training on the receiver when the soft failure has occurred and the initialization control signal is set to a first level, and performs the AC training and direct current (DC) training on the receiver when the soft failure has occurred and the initialization control signal is set to second level.

BRIEF DESCRIPTION OF THE DRAWINGS

Embodiments of the inventive concept will be more clearly understood from the following detailed description taken in conjunction with the accompanying drawings in which:

FIGS. 15A and 15B are timing diagrams illustrating a status of the source driver of FIG. 14 and states of transmission channels;

DETAILED DESCRIPTION OF THE EMBODIMENTS

Figure 1:
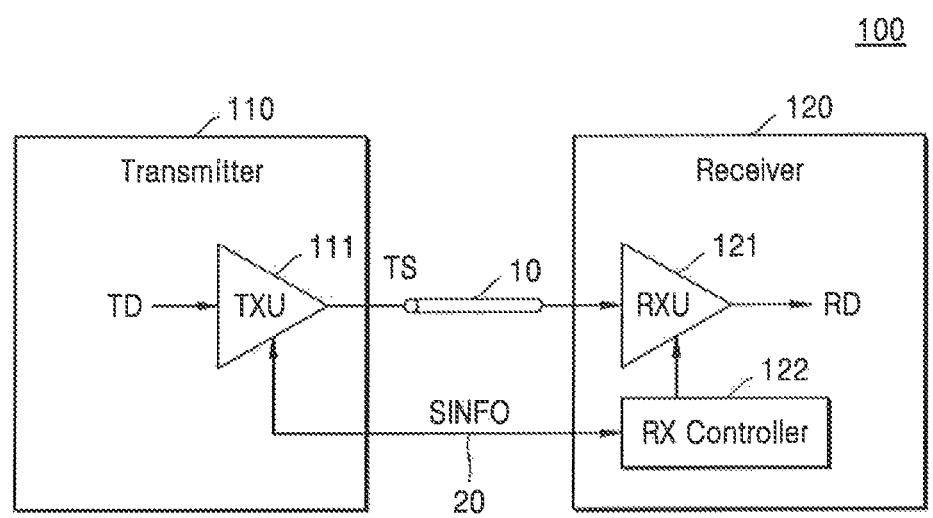
FIG. 1 is a block diagram of a transmitting and receiving system according to an exemplary embodiment of the inventive concept.

The present inventive concept will now be described more fully hereinafter with reference to the accompanying drawings, in which embodiments of the inventive concept are shown. These embodiments are provided so that this disclosure is thorough and complete and fully conveys the scope of the inventive concept to one skilled in the art. Accordingly, while the inventive concept can be modified in various ways and take on various alternative forms, there is no intent to limit the inventive concept to the particular forms disclosed. On the contrary, the inventive concept is to cover all modifications, equivalents, and alternatives falling within the spirit and scope of the inventive concept. Like reference numerals refer to like elements throughout.

It will be understood that when an element is referred to as being "connected" or "coupled" to another element, it can be directly connected or coupled to the other element or intervening elements may be present. As used herein, the singular forms "a", "an", and "the" are intended to include the plural forms as well, unless the context clearly indicates otherwise.

FIG. 1 is a block diagram of a transmitting and receiving system 100 according to an exemplary embodiment of the inventive concept. In some embodiments, the transmitting and receiving system 100 may be applied to a display device, an audio device, a home network, a broadcast network, a wired or wireless communication system, and the like. Also, the transmitting and receiving system 100 may be applied to various other electronic systems.

Referring to FIG. 1, the transmitting and receiving system 100 includes a transmitter 110, a receiver 120, and one or more transmission channels. The transmission channels may include a data transmission channel 10 and a state transmission channel 20. The data transmission channel 10 may be referred to as a main link, and the state transmission channel 20 may be referred to as an auxiliary link.

The transmitter 110 may transmit transmission data TD to the receiver 120 depending on an interface scheme of the transmitting and receiving system 100. For example, when the transmitting and receiving system 100 is mounted on a display device, the transmission data TD may be display data. The transmitter 110 includes a transmission unit 111, and the transmission unit 111 may convert the transmission data TD and a clock signal into a transmission signal TS according to the interface scheme and characteristics of the data transmission channel 10, and provides the transmission signal TS to the data transmission channel 10.

In an embodiment, the transmission unit 111 performs a serial conversion on the transmission data TD according to an interface scheme. Also, the transmission unit 111 may embed the clock signal in the transmission signal TS. The transmission unit 111 may convert the transmission data TD into packet data. For example, the packet data may include a header and a body portion, where the header identifies the type of data and the body portion includes data such as the transmission data TD.

In an embodiment, when the data transmission channel 10 includes two signal lines, the transmission unit 111 may transmit the transmission signal TS including a differential signal pair through the two signal lines.

In an embodiment, the interface scheme may be one selected from a universal serial interface (USI), a central processing unit (CPU) interface, an RGB interface (e.g., a component video interface), a mobile industry processor interface (MIPI), a mobile display digital interface (MDDI), a compact display port (CDP), a mobile pixel link (MPL), a current mode advanced differential signaling (CMADS), a serial peripheral interface (SPI), an inter-integrated circuit (I2C) interface, a display-port (DP) and embedded display-port (eDP) interface, a camera control interface (CCI), a camera serial interface (CSI), a micro controller unit (MCU) interface, and a high definition multimedia interface (HDMI). Besides the above described interfaces, the interface scheme may be one of various high speed serial interface schemes.

The receiver 120 may receive data from the transmitter 110. The receiver 120 includes a receiving unit 121 and a receiving controller 122. The receiving unit 121 may receive the transmission signal TS through the data transmission channel 10, and may recover receive data RD and a clock signal from the transmission signal TS. The receiving controller 122 may control the receiving unit 121 so that signal receiving efficiency increases. The receiving controller 122 may control the initialization of the receiving unit 121. The initialization denotes adjusting a setting value in the receiving unit 121 to compensate for signal distortion of a received signal and adjust a signal gain.

According to an exemplary embodiment, the receiving unit 121 performs initialization when the receiver 120 or the transmitting and receiving system 100 is powered on, when an abnormal reception occurs, or periodically. In an embodiment, the receiving unit 121 selectively performs initialization according to one of first and second initialization modes, under the control of the receiving controller 122. The first initialization mode may be referred to as partial initialization, and the second initialization mode may be referred to as full initialization.

The partial initialization may include alternating current (AC) training that optimizes AC characteristics (referred to as dynamic characteristics) of the receiving unit 121, and the full initialization may include the AC training and direct current (DC) training that optimizes DC characteristics (referred to as static characteristics) of the receiving unit 121. For example, the AC training may include an operation of adjusting an equalization coefficient of an equalizer that is provided in the receiving unit 121 or recovering a clock signal of the receiving unit 121. The DC training may include an operation of matching the input impedance of the receiving unit 121 to the impedance of the data transmission channel 10 or compensating for an output offset of a comparator that is provided in the receiving unit 121.

The receiving unit 121 may perform AC training based on training data transmitted through the data transmission channel 10, for example, a training pattern. Also, the receiving unit 121 may perform DC training while variously changing internal conditions without receiving data. In an embodiment, as described above, the receiving unit 121 may perform only AC training or perform both AC training and DC training, under the control of the receiving controller 122. In an embodiment, a period during which DC training is performed is longer than that during which AC training is performed.

The transmission unit 111 and the receiving controller 122 may transmit and receive a state information signal SINFO through the transmission channel 20. In an embodiment, the receiving controller 122 provides a reception state of the receiving unit 121 to the transmitter 110 as the state information signal SINFO. For example, when the receiving unit 121 is under a condition in which the receiving unit 121 does not receive a signal normally, the receiving unit 121 provides a state information signal SINFO indicating an abnormal state to the transmission unit 111 of the transmitter 110. For example, the receiving unit 121 may provide a state information signal SINFO indicating an abnormal state to the transmission unit 111 of the transmitter 110 when the receiving unit 121 is incapable of receiving a transmitted signal or processing a received signal. In response to the state information signal SINFO indicating the abnormal state, the transmission unit 111 may stop data transmission and transmit training data for the initialization of the receiving unit 121, for example, a training pattern.

In an embodiment, the transmission unit 111 provides the receiving controller 122 with a state information signal SINFO requesting the initialization of the receiving unit 121 and transmits a training pattern to the receiving unit 121. The receiving controller 122 may initialize the receiving unit 121 in response to the state information signal SINFO.

In an embodiment, the receiving controller 122 controls the initialization of the receiving unit 121 based on an initialization control signal provided from the transmission unit 111. The receiving controller 122 may control the receiving unit 121 to perform partial initialization, based on a first level of the initialization control signal provided from the transmission unit 111, and may control the receiving unit 121 to perform full initialization, based on a second level of the initialization control signal. In an embodiment, the transmission unit 111 determines a level of the initialization control signal, based on the number of abnormal state occurrences or the number of initializations, and an elapsed time.

In an embodiment, the receiving controller 122 may control the initialization of the receiving unit 121, based on the number of abnormal state occurrences or the number of initializations, and an elapsed time. In an embodiment, the receiving controller 122 controls the receiving unit 121 to perform partial initialization when the number of abnormal state occurrences or the number of initializations is equal to or less than a threshold value, and controls the receiving unit 121 to perform full initialization when the number of abnormal state occurrences or the number of initializations exceeds the threshold value. In an embodiment, the receiving controller 122 controls the receiving unit 121 to perform partial initialization when the number of abnormal state occurrences or the number of initializations is equal to or less than a threshold value during a predetermined time period, and controls the receiving unit 121 to perform full initialization when the number of abnormal state occurrences or the number of initializations exceeds the threshold value during the predetermined time period.

As described above, in the transmitting and receiving system 100 according to an exemplary embodiment, the receiver 120 may perform DC training in addition to AC training to compensate for degradation of a gain of a received signal, but may selectively perform DC training requiring a longer execution time, based on the number of abnormal state occurrences. Accordingly, the receiver 120 may minimize a time that is required for initialization, and may also improve receiving efficiency. As a result, transmission and receiving efficiency of the transmitting and receiving system 100 may be improved.

Figure 2:
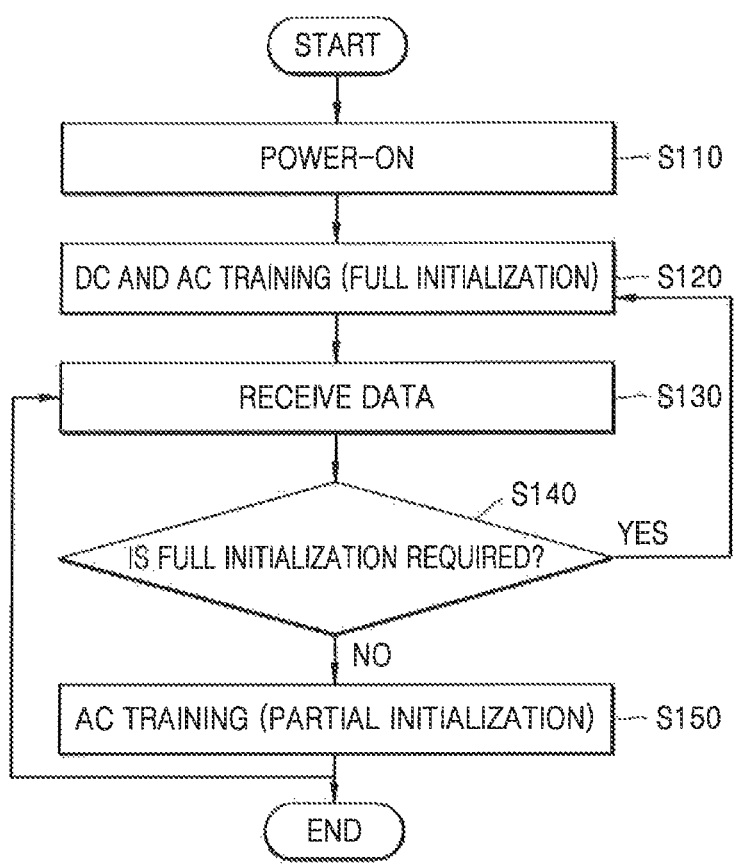
FIG. 2 is a flowchart illustrating an example of a method of operating a receiver of FIG. 1 according to an exemplary embodiment of the inventive concept.

FIG. 2 is a flowchart illustrating a method of operating the receiver 120 of FIG. 1 according to an exemplary embodiment of the inventive concept. The method may be applied to the receiver 120 described with reference to FIG. 1.

Referring to FIG. 2, when power is applied to the receiver 120 of FIG. 1 (operation S110), the receiver 120 performs full initialization (operation S120). The full initialization includes DC training and AC training.

When the full initialization has completed, the receiver 120 may receive data (operation S130). The receiver 120 may receive data from the transmitter 110 of FIG. 1 through the data transmission channel 10 of FIG. 1.

While the data is being received or after the data has been received, the initialization of the receiver 120 may be required. Specifically, the initialization of the receiving unit 121 of FIG. 1 may be required, and the initialization may be required periodically or when an abnormal state of the receiving unit 121 occurs. The receiver 120 determines whether full initialization is required (operation S140). In an embodiment, the receiver 120 determines whether full initialization is required, according to a level of an initialization control signal received from receiving data in the operation S130. In an embodiment, the receiver 120 counts the number of abnormal state occurrences or the number of initializations, and determines that full initialization is required when the counted number exceeds a predetermined threshold value.

If full initialization is not required, the receiver 120 performs partial initialization (operation S150). In other words, the receiver 120 may perform only AC training.

Otherwise, if full initialization is required, the receiver 120 performs the full initialization (operation S120). In other words, the receiver 120 may perform AC training and DC training.

According to the method of FIG. 2, when power is applied to the receiver 120, the receiver 120 may optimize a reception state by performing full initialization and then selectively performing full initialization or partial initialization when initialization is required and based on the type of initialization required.

Figure 3:
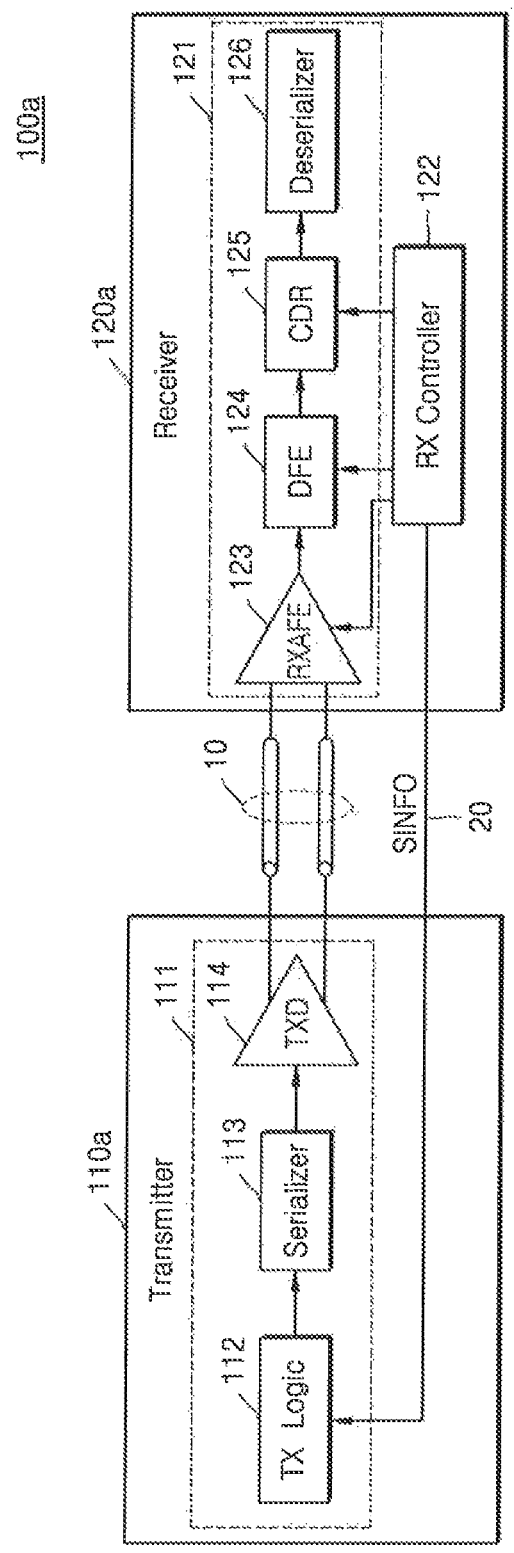
FIG. 3 is a detailed block diagram of the transmitting and receiving system of FIG. 1 according to an exemplary embodiment of the inventive concept.

FIG. 3 is a detailed block diagram of the transmitting and receiving system 100 of FIG. 1, according an exemplary embodiment of the inventive concept.

Referring to FIG. 3, a transmitting and receiving system 100a, which may be used to implement the transmitting and receiving system 100 of FIG. 1, includes a transmitter 110a and a receiver 120a. The transmitter 110a includes a transmission unit 111, and the receiver 120a includes a receiving unit 121 and a receiving controller 122.

The transmission unit 111 includes transmission logic 112, a serializer 113, and a transmission driver 114. The transmission logic 112 may generate transmission data to be transmitted to the receiver 120a through a data transmission channel 10. For example, when the transmitting and receiving system 100a is applied to a display device, the transmission logic 112 may generate packet-type transmission data including display data, various control signals, and an error detection signal. In addition, when a state information signal SINFO that is transmitted from the receiver 120a to the transmitter 120a through a state transmission channel 20 indicates an abnormal state in which data cannot be received by the receiver 120a, the transmission logic 112 may control the transmission driver 114 so that the transmission driver 114 transmits a training pattern for the initialization of the receiving unit 121 to the receiving unit 121.

The serializer 113 may convert transmission data transmitted in parallel from the transmission logic 112 into serial data. The transmission driver 114 may transmit serialized transmission data through the data transmission channel 10 to the receiving unit 121. In an embodiment, the data transmission channel 10 may include two signal lines, as shown in FIG. 3, and the transmission driver 114 may convert the serialized transmission data into a differential signal pair and transmit the differential signal pair through the data transmission channel 10.

The receiving unit 121 includes a receive analog front end (RXAFE) 123, an equalizer 124, a clock and data recovery (CDR) circuit 125, and a deserializer 126.

The RXAFE 123 may receive a differential signal pair from the data transmission channel 10. In an embodiment, the RXAFE 123 includes a comparator that compares two signals of the differential signal pair to each other to output a single signal. The equalizer 124 may adjust a gain of an input signal and compensate for signal distortion due to the data transmission channel 10. In an embodiment, the equalizer 124 includes a decision feedback equalizer (DFE). However, the inventive concept is not limited thereto, and the equalizer 124 may include various other equalizers. Hereinafter, an embodiment where the equalizer 124 is a DFE is described as an example.

The CDR circuit 125 may recover a clock signal and data by using an equalized signal.

The deserializer 126 may convert serial data into parallel data based on a clock signal that is provided from the CDR circuit 125.

The receiving controller 122 may control the receiving unit 121. In particular, the receiving controller 122 may control the initialization of the receiving unit 121. When the state information signal SINFO indicates an abnormal state in which data cannot be received, the receiving controller 122 controls the receiving unit 121 so that the receiving unit 121 selectively performs partial initialization or full initialization. In an embodiment, the receiving controller 122 transmits the state information signal SINFO indicating an abnormal state to the transmission logic 112 when the CDR circuit 125 is in an unlock state or internal setting values for the optimization of the RXAFE 123, the DFE 124, and the CDR circuit 125 are changed due to an electrostatic discharge (ESD).

Although the receiving controller 122 provides the state information signal SINFO to the transmission logic 112 in an embodiment, the inventive concept is not limited thereto. In an embodiment, the transmission logic 112 provides the state information signal SINFO to the receiving controller 122.

In an embodiment, when partial initialization is performed, the receiving controller 122 controls the receiving unit 121 so that the receiving unit 121 performs AC training. When full initialization is performed, the receiving controller 122 may control the receiving unit 121 so that the receiving unit 121 performs AC training and DC training.

When AC training is performed, the DFE 124 and the CDR circuit 125 may be trained. The receiving controller 122 may control the DFE 124 and the CDR circuit 125 to train the DFE 124 and the CDR circuit 125. The DFE 124 and the CDR circuit 125 may be trained, that is, optimized, based on a training pattern that is received from the RXAFE 123. For example, an optimized equalization coefficient may be set in the DFE 124, and the CDR circuit 125 may be stabilized in a lock state.

When DC training is performed, the RXAFE 123 may be optimized. The receiving controller 122 may control the RXAFE 123 to optimize the RXAFE 123. The RXAFE 123 may be optimized by variously changing internal conditions regardless of the reception of a signal. For example, when DC training is performed, the impedance of the data transmission channel 10 and the input impedance of the RXAFE 123 may be matched with each other. Alternatively, an offset of a comparator included in the RXAFE 123 may be removed or adjusted.

In an embodiment, when full initialization is performed, the receiving controller 122 controls the receiving unit 121 so that the receiving unit 121 performs AC training and DC training. When partial initialization is performed, the receiving controller 122 may control the receiving unit 121 so that the receiving unit 121 performs only some AC training. For example, the receiving controller 122 may optimize the RXAFE 123, the DFE 124, and the CDR circuit 125 during full initialization, and may optimize the DFE 124 and the CDR circuit 125 during partial initialization.

Figure 4:
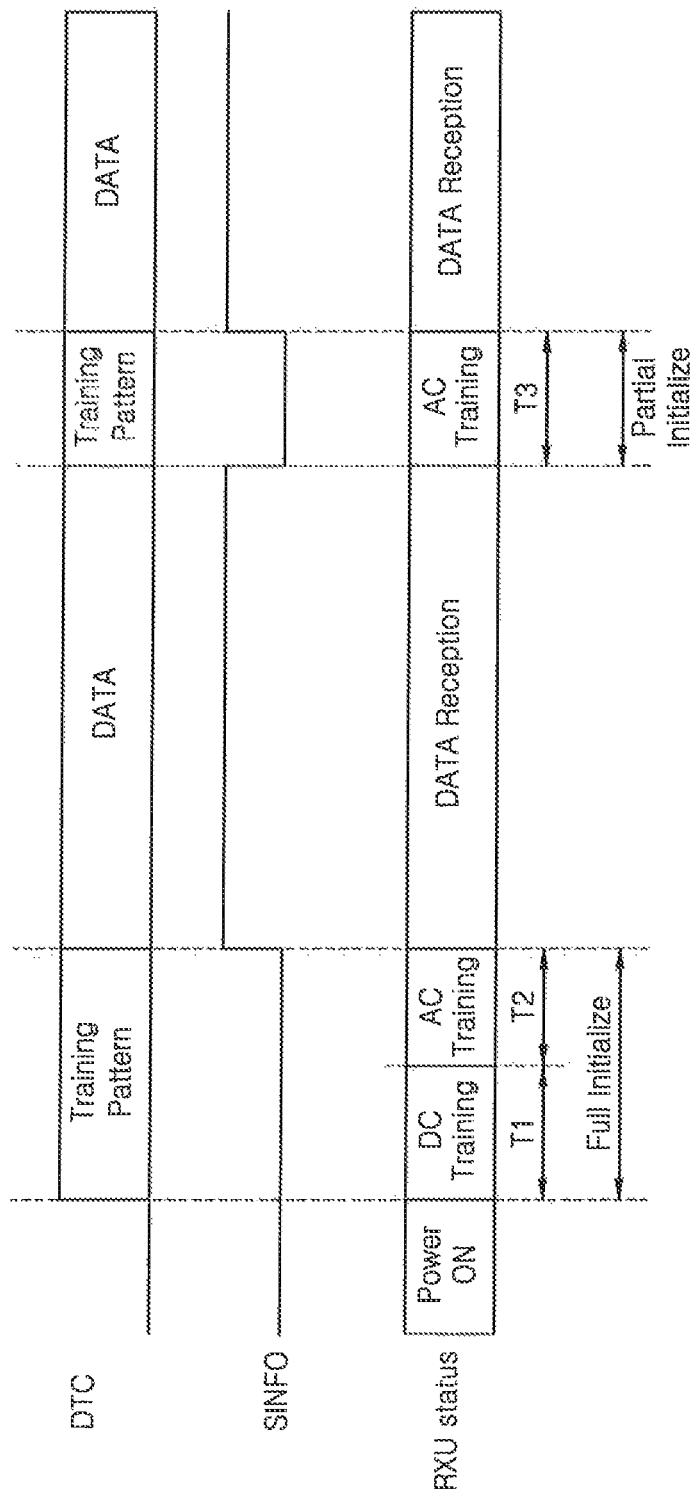
FIG. 4 is a timing diagram illustrating signals, which are transmitted through channels in the transmitting and receiving system of FIG. 3, and a state of a receiver of FIG. 3.

FIG. 4 is a timing diagram illustrating signals, which are transmitted through channels in the transmitting and receiving system 100a of FIG. 3, and a status of the receiver 120a of FIG. 3.

Referring to FIG. 4, when the receiver 120a of FIG. 3 is powered on, the receiver 120a performs full initialization. The receiver 120a may perform DC training during a period T1 and then perform AC training during a period T2. For example, the RXAFE 123 may be optimized during the period T1, and the DFE 124 and the CDR circuit 125 may be optimized during the T2 period. In an embodiment, the duration of the period T2 is shorter than that of the period T1. When the receiver 120a performs initialization, the state information signal SINFO may be at a first level, for example, a logic low, which indicates a state in which data cannot be received, and based on the state information signal SINFO at the first level, the transmitter 110a of FIG. 3 may transmit a training pattern to the receiver 120a. Accordingly, when the receiver 120a performs full initialization, a training pattern may be transmitted through a data transmission channel DTC to the receiver 120a. The receiver 120a may perform AC training based on the training pattern during the period T2.

When the full initialization of the receiver 120a has completed, the state information signal SINFO may be at a second level, for example, a logic high, which indicates a state in which data can be received. Accordingly, the transmitter 110a may transmit normal data to the receiver 120a. Packetized data may be transmitted through the data transmission channel DTC to the receiver 120a. The receiver 120a may receive data transmitted from the transmitter 110a.

Thereafter, when the state information signal SINFO is at the first level that indicates a state in which data cannot be received, a training pattern may be transmitted through the data transmission channel DTC and the receiver 120a may perform partial initialization. The receiver 120a skips DC training and performs AC training during a period T3.

In an embodiment, the duration of the period T3 is equal to, substantially equal to or shorter than that of the period T2. In an embodiment, AC training that is performed during the period T3 may be the same as or substantially the same as that is performed during the period T2. However, the inventive concept is not limited thereto. For example, only some AC training that is performed during the period T2 may be performed during the period T3.

When the partial initialization of the receiver 120a has completed, the state information signal SINFO may be at the second level, for example, a logic high, which indicates a state in which data can be received. Packetized data may be transmitted through the data transmission channel DTC, and the receiver 120a may receive data transmitted from the transmitter 110a.

Thereafter, when the state information signal SINFO is at the first level that indicates a state in which the receiver 120a cannot receive data, a training pattern may be transmitted through the data transmission channel DTC and the receiver 120a may selectively perform partial initialization or full initialization. The receiver 120a may perform full initialization during the period T1 and the period T2 or perform partial initialization during the period T3.

Figure 5:
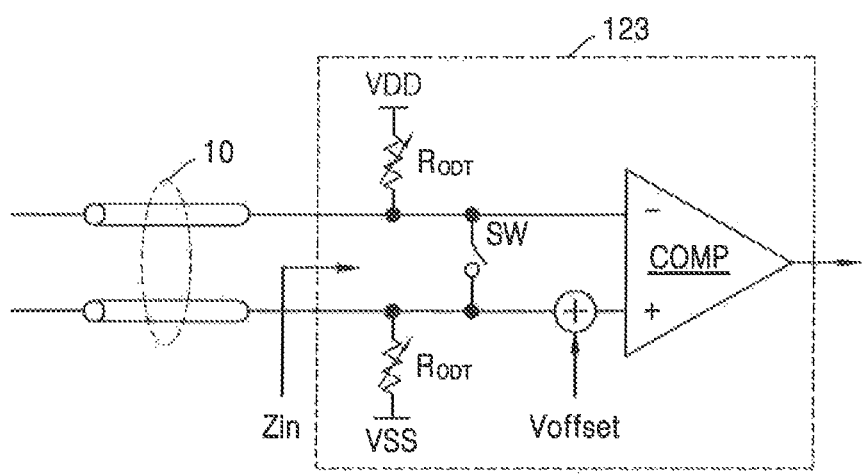
FIG. 5 is a circuit diagram of a receive analog front end (RXAFE) of FIG. 3 according to an exemplary embodiment of the inventive concept.

FIG. 5 is a circuit diagram of the RXAFE 123 of FIG. 3 according to an exemplary embodiment of the inventive concept.

Referring to FIG. 5, the RXAFE 123 includes a comparator COMP for receiving a differential signal pair transmitted through a data transmission channel 10, a switch SW for connecting two input terminals of the comparator COMP, and variable resistors $R_{ODT}$ connected to the input terminals of the comparator COMP. In an embodiment, the variable resistors $R_{ODT}$ are termination resistors connected to sources of power supply voltages VDD and VSS. In an embodiment, the power supply voltage VSS is a ground voltage whose magnitude is lower than the power supply voltage VDD. In an embodiment, the variable resistors $R_{ODT}$ are potentiometers or rheostats.

In a DC training period, as the resistance values of the variable resistors $R_{ODT}$ are adjusted in a programmable manner, the input impedance Zin of the receiving unit 121 of FIG. 3 may be matched with respect to the data transmission channel 10. In addition, when the switch SW is turned on, an offset of the comparator COMP may be compensated for based on an output of the comparator COMP when the two input terminals of the comparator COMP are connected to each other. By providing an offset voltage Voffset to one input terminal of the comparator COMP so that an output level of the comparator COMP is an intermediate level of the sum of power supply voltages that are applied to the comparator COMP, the offset of the comparator COMP may be compensated for.

Figure 6:
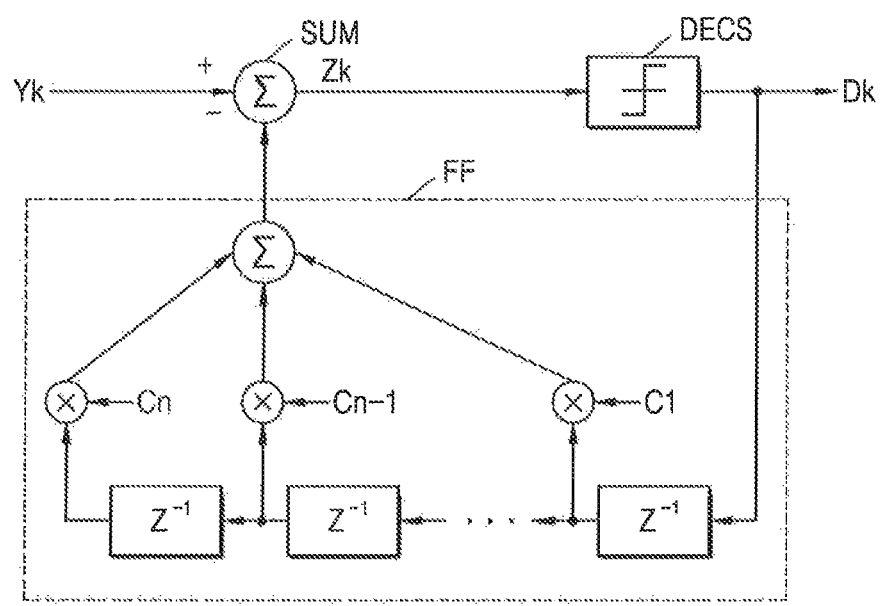
FIG. 6 is a circuit diagram of a decision feedback equalizer (DFE) of FIG. 3 according to an exemplary embodiment of the inventive concept.

FIG. 6 is a circuit diagram of the DFE 124 of FIG. 3 according to an exemplary embodiment of the inventive concept.

Referring to FIG. 6, the DFE 124 includes a summer SUM (e.g., an adder or adding circuit), a feedback filter FF, and a determiner DECS. The DFE 124 may reduce an error between symbols of a received signal Yk, caused by signal distortion, by negative-feeding a value, obtained by applying a weight to a determined value Dk, back to the received signal Yk through the feedback filter FF. The determiner DECS may be referred to as a Decision Slicer. The Decision Slicer may quantize the input by making a symbol decision. The feedback filter FF may be a feedback finite impulse response (FIR) filter. The feedback filter includes a summer, multipliers, and a delay line consisting of unit delays, where each unit delay is a $Z^{-1}$ operator in Z-transform notation.

When AC training is performed, optimized values of equalization coefficients C1, ..., Cn−1, and Cn of the feedback filter FF may be calculated and thus the DFE 124 may be optimized.

Figure 7:
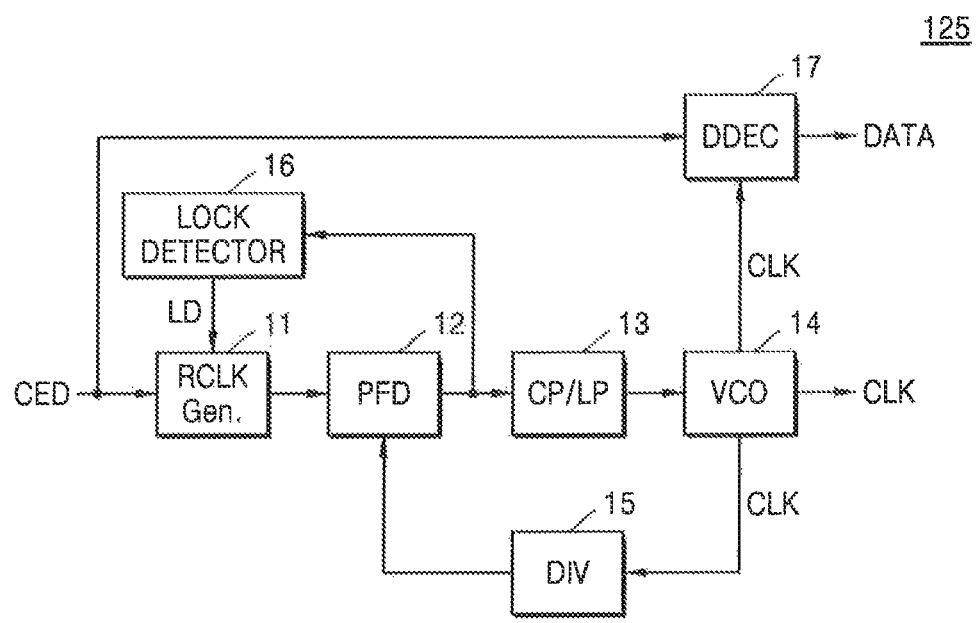
FIG. 7 is a block diagram of a clock and data recovery (CDR) circuit of FIG. 3 according to an exemplary embodiment of the inventive concept.

FIG. 7 is a block diagram of the CDR circuit 125 of FIG. 3 according to an exemplary embodiment of the inventive concept.

Referring to FIG. 7, the CDR circuit 125 includes a reference clock generator 11, a phase frequency detector (PFD) 12, a charge pump/loop filter (CP/LP) 13, a voltage controlled oscillator (VCO) 14, a divider 15, a lock detector 16, and a data determiner 17.

The reference clock generator 11 may output a clock signal included in clock embedded data (CED) as a reference clock signal, based on a lock detection signal LD having a first level, for example, a logic low. For example, CED that is transmitted in an initialization period may be a training pattern. The PFD 12 compares the reference clock signal with a divided clock signal output by the divider 15 to detect a phase difference between the reference clock signal and the divided clock signal, and outputs the phase difference. The CP/LP 13 may convert an output signal of the PFD 12 into a voltage signal and output the voltage signal as a control voltage signal for controlling the VCO 14. The VCO 14 may output a clock signal CLK having a predetermined frequency in response to the control voltage signal. The divider 15 may divide the clock signal CLK output from the VCO 14 and output the divided clock signal. The data determiner 17 may recover data DATA from the CED based on the clock signal CLK. For example, edges of the clock signal CLK may be used by the data determiner 17 to identify portions of the CED that correspond to parts of the recovered data DATA.

The lock detector 16 may output a lock detection signal LD based on an output signal of the PFD 12. When the CDR circuit 125 is in a lock state, the lock detector 16 may output the lock detection signal LD at a second level, for example, a logic high. When the CDR circuit 125 is in an unlock state, the lock detector 16 may output the lock detection signal LD at the first level, for example, a logic low. When AC training is performed, the CDR circuit 125 may perform a locking operation so as to be in a lock state.

In an embodiment, if the lock detector 16 outputs the lock detection signal LD at a logic low when data is received, the receiving controller 122 of FIG. 3 determines that an abnormal situation has occurred in the receiving unit 121, and generates a state information signal SINFO indicating an abnormal state.

Figure 8A:
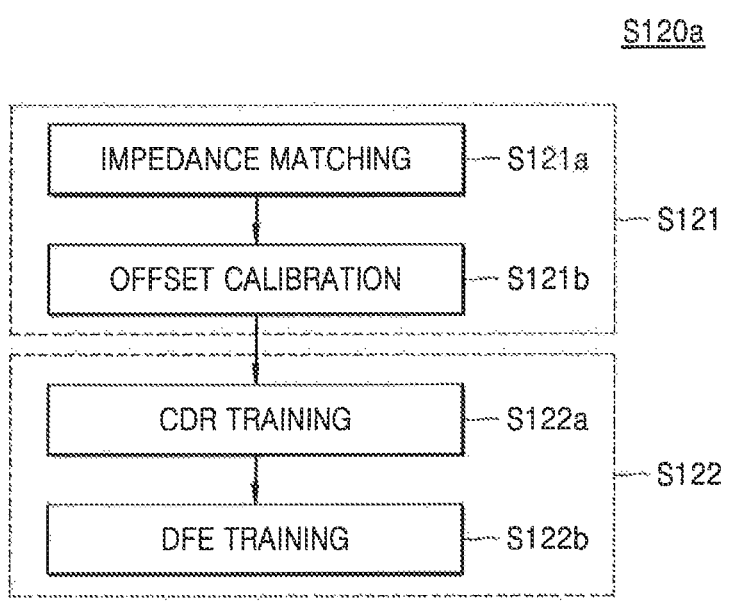
FIG. 8A is a flowchart illustrating a full initialization method of a receiver according to an exemplary embodiment of the inventive concept.
Figure 8B:
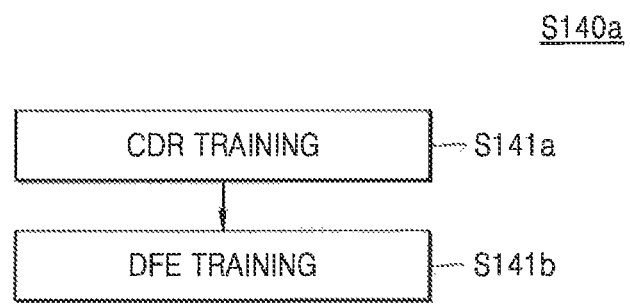
FIG. 8B is a flowchart illustrating a partial initialization method of a receiver according to an exemplary embodiment of the inventive concept.

FIG. 8A is a flowchart illustrating a full initialization method of a receiver according to an exemplary embodiment of the inventive concept, and FIG. 8B is a flowchart illustrating a partial initialization method of a receiver according to an exemplary embodiment of the inventive concept.

Referring to FIG. 8A, when the receiver 120 or 120a performs full initialization, DC training S121 and AC training S122 are performed. The DC training S121 may include impedance matching S121a of the RXAFE 123 and offset calibration S121b of the comparator COMP. In FIG. 8A, although the offset calibration S121b is performed after the impedance matching S121a is performed, the inventive concept is not limited thereto. For example, the impedance matching S121a may be performed after the offset calibration S121b is performed or at substantially the same time.

In an embodiment, one selected from the impedance matching S121a and the offset calibration S121b is performed. For example, in an embodiment, either the impedance matching S121a is skipped or the offset calibration S121b is skipped.

Thereafter, the AC training S122 is performed. The AC training S122 may include CDR training S122a that causes the CDR circuit 125 to enter a lock state, and DFE training S122b that adjusts (e.g., optimizes) equalization coefficients of the DFE 124. In FIG. 8A, although the DFE training S122b is performed after the CDR training S122a is performed, the inventive concept is not limited thereto, and the order may be changed. In an embodiment, the DFE training S122b may be performed first before the CDR training S122a is performed. In an embodiment, the CDR training S122a and the DFE training S122b may be performed at the same or substantially the same time. In an embodiment, the DFE training S122b is skipped.

Referring to FIG. 8B, AC training is performed when the receiver 120 or 120a performs partial initialization. The AC training may include CDR training S141a and DFE training S141b. In FIG. 8B, although the DFE training S141b is performed after the CDR training S141a is performed, the inventive concept is not limited thereto, and the order may be changed. In an embodiment, the DFE training S141b is performed first before the CDR training S141a is performed. In an embodiment, the CDR training S141a and the DFE training S141b are performed at the same time. In an embodiment, the DFE training S141b is skipped.

Figure 9:
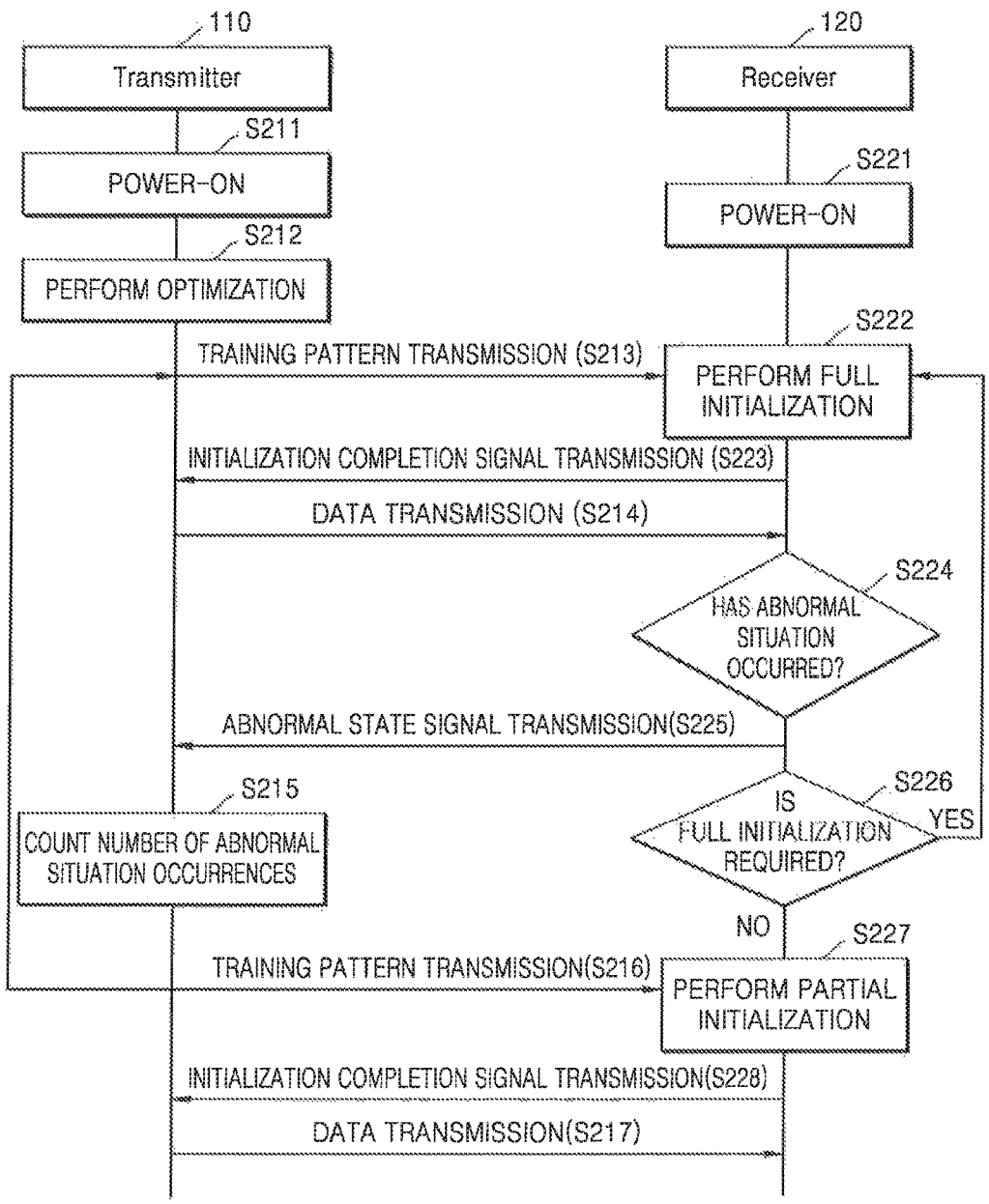
FIG. 9 is a flowchart illustrating an operating method of a transmitting and receiving system, according to an exemplary embodiment of the inventive concept.

FIG. 9 is a flowchart illustrating a method of operating a transmitting and receiving system, according to an exemplary embodiment of the inventive concept.

Referring to FIG. 9, a transmitter 110 performs optimization (stabilization) (operation S212) when power is applied thereto (operation S211). Here, the power may be applied to a receiver 120 (operation S221). The optimization performed by the transmitter 110 may include the transmitter 110 itself being optimized.

After the transmitter 110 performs the optimization, the transmitter 110 transmits a training pattern to the receiver 120 (operation S213). The transmitter 110 may transmit a first training pattern through a data transmission channel (for example, the data transmission channel 10 of FIGS. 1 and 3). The receiver 120 performs a full initialization in response to the received first training pattern (operation S222). The receiver 120 performs DC training and performs AC training based on the training pattern. When the full initialization has completed, the receiver 120 transmits an initialization completion signal to the transmitter 110 (operation S223). For example, the receiver 120 may transmit a state information signal SINFO at a second level, for example, a logic high, as the initialization completion signal through a state transmission channel (for example, the state transmission channel 20 of FIGS. 1 and 3). The transmitter 110 transmits data through the data transmission channel 10 in response to receipt of the initialization completion signal (operation S214). In an embodiment, the data is packetized data.

While receiving the data, the receiver 120 determines (e.g., senses) whether an abnormal situation has occurred (operation S224). For example, when the CDR circuit 125 of FIG. 3 is in an unlock state or internal setting values of elements of the receiver 120 have changed, the receiver 120 may determine that an abnormal situation has occurred, that is, an abnormal state, has occurred. The receiver 120 transmits an abnormal state signal to the transmitter 110 (operation S225). For example, the receiver 120 may transmit a state information signal SINFO at a first level, for example, a logic low, as the abnormal state signal through the state transmission channel 20. The receiver 120 determines whether full initialization is required (operation S226). In an embodiment, the receiver 120 determines that full initialization is required when the level of an initialization control signal included in data transmitted from the transmitter 110 is a second level, for example, a logic high. The transmitter 110 counts the number of abnormal situation occurrences (operation S215). When the counted number is less than a preset threshold value, the transmitter 110 transmits an initialization control signal at a first level, for example, a logic low, when transmitting data, and when the counted number is equal to or greater than the preset threshold value, the transmitter 110 transmits an initialization control signal at a second level, for example, a logic high, when transmitting data. In an embodiment, the transmitter 110 resets the counted number for each preset time period, and transmits an initialization control signal at a second level when transmitting data when the counted number is equal to or greater than a preset threshold value. Since the transmitter 120 determines whether full initialization is required when a next abnormal situation occurs after the initialization control signal is received, full initialization may be performed when the number of abnormal situation occurrences exceeds a threshold value.

If full initialization is not required, the transmitter 110 transmits a second training pattern (operation S216) and the receiver 120 performs partial initialization in response to the received second training pattern (operation S227). After partial initialization has completed (operation S227), the receiver 120 transmits an initialization completion signal to the transmitter 110 (operation S228). The transmitter 110 transmits data to the receiver 120 in response to receive of the initialization completion signal (operation S217).

Otherwise, if full initialization is required, the transmitter 110 transmits the first training pattern (operation S213) and the receiver 120 performs full initialization in response to receipt of the first training pattern (operation S222). After full initialization has completed (operation S222), the receiver 120 transmits an initialization completion signal to the transmitter 110 (operation S223). The transmitter 110 transmits data to the receiver 120 in response to receipt of the initialization completion (operation S214).

As described above, when transmitting data (operation S214 or S217), the transmitter 110 may transmit an initialization control signal at a first level when the counted number of abnormal situation occurrences is less than a threshold value, and may transmit an initialization control signal at a second level when the counted number of abnormal situation occurrences is equal to or greater than the threshold value.

Thereafter, when an abnormal situation occurs, the receiver 120 may selectively perform partial initialization or full initialization through the operations described above.

Figure 10:
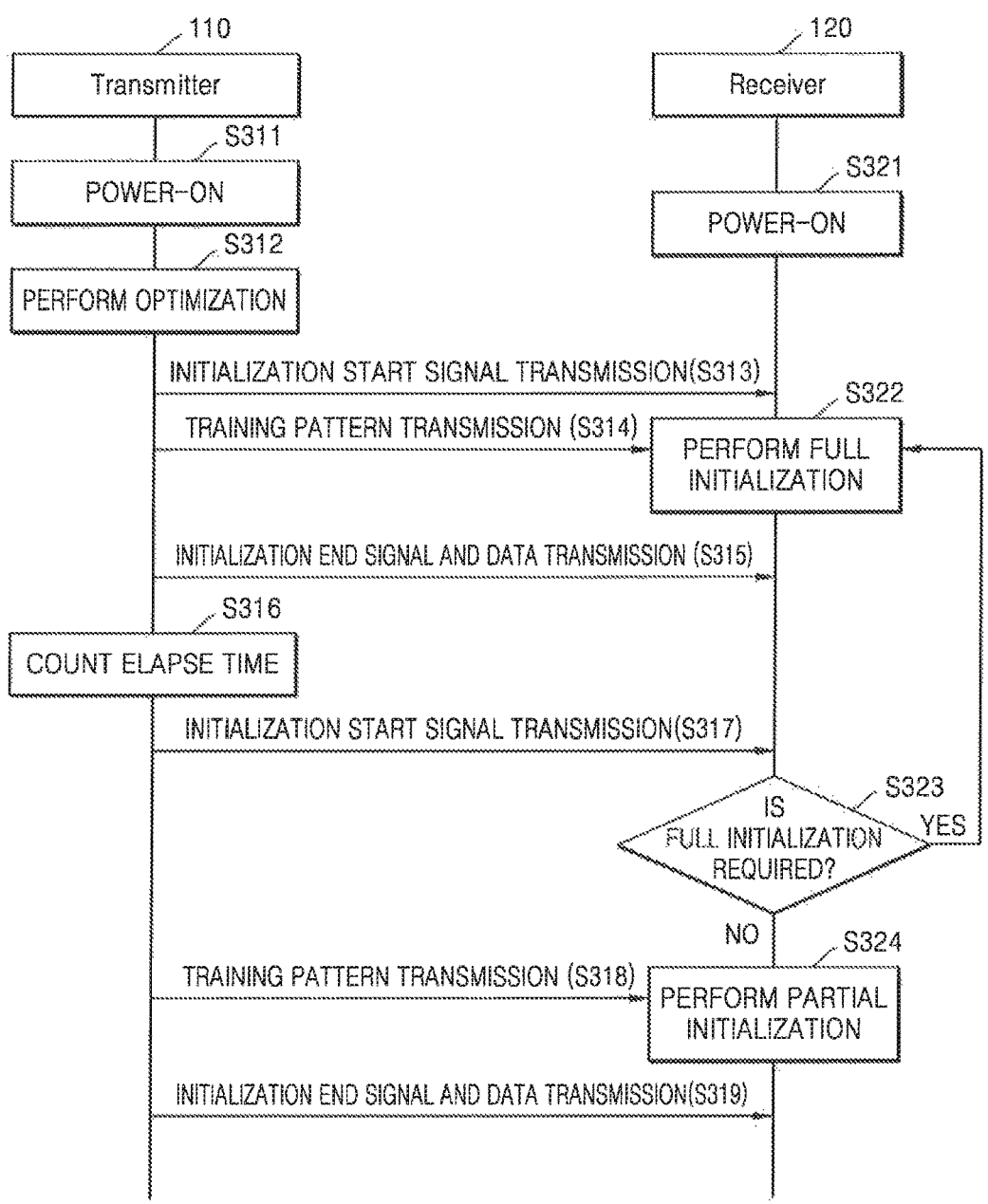
FIG. 10 is a flowchart illustrating a method of operating a transmitting and receiving system, according to an exemplary embodiment of the inventive concept.

FIG. 10 is a flowchart illustrating a method of operating a transmitting and receiving system, according to an exemplary embodiment of the inventive concept.

Referring to FIG. 10, a transmitter 110 may perform optimization (stabilization) (operation S312) when power is applied thereto (operation S311). Here, the power may be applied to a receiver 120 (operation S321). The optimization performed by the transmitter 110 may include the transmitter 110 being optimized itself.

After the transmitter 110 performs the optimization, the transmitter 110 transmits an initialization start signal to the receiver 120 (operation S313). For example, the transmitter 110 may transmit a state information signal SINFO at a first level, for example, a logic low, as the initialization start signal through a state transmission channel (for example, the state transmission channel 20 of FIGS. 1 and 3).

Thereafter, the transmitter 110 transmits a first training pattern to the receiver 120 (operation S314). The receiver 120 performs full initialization in response to the received first training pattern (operation S322). The receiver 120 performs DC training and performs AC training based on the training pattern to achieve the full initialization.

After a predetermined first time elapses, the transmitter 110 transmits an initialization end signal and data to the receiver 120 (operation S315). The transmitter 110 may transmit a state information signal SINFO at a second level, for example, a logic high, as the initialization end signal to the receiver 120, and may transmit data to the receiver 120 through the data transmission channel 10. For example, a timer may be started after the transmitter 110 transmits the first training pattern where the initialization end signal and data are transmitted after the timer has counted that the first time has elapsed.

The transmitter 110 counts a data transmission elapse time (operation S316), and transmits an initialization start signal when a predetermined time elapses (operation S316). For example, when the transmitting and receiving system is applied to a display device, the transmitter 110 may transmit an initialization start signal whenever frame data of N frames (where N is an integer that is equal to or greater than 1) is transmitted.

The receiver 120 determines whether full initialization is required (operation S232). In an embodiment, when the level of an initialization control signal included in data transmitted from the transmitter 110 is a second level, for example, a logic high, the receiver 120 determines that full initialization is required. In this case, the transmitter 110 may change the level of the initialization control signal based on an elapsed time or the number of initializations. For example, when the number of initializations is equal to or greater than a threshold value, the transmitter 110 may transmit an initialization control signal at a second level when transmitting data. Since the transmitter 120 determines whether full initialization is required when a next initialization start signal is transmitted after the initialization control signal is received, full initialization may be performed when the number of initializations exceeds a threshold value.

In an embodiment, the receiver 120 internally counts the number of initializations, that is, the number of transmissions of an initialization start signal, and may determine that full initialization is required when the counted number exceeds a threshold value.

If full initialization is not required, the transmitter 110 transmits a second training pattern (operation S318) and the receiver 120 performs partial initialization in response to the received second training pattern (operation S324). After a predetermined second time elapses, the transmitter 110 transmits an initialization end or completion signal and data to the receiver 120 (operation S319).

Otherwise, if full initialization is required, the transmitter 110 transmits the first training pattern (operation S314) and the receiver 120 performs full initialization in response to the received first training pattern (operation S322). After a predetermined first time elapses, the transmitter 110 transmits an initialization completion signal and data to the receiver 120 (operation S315). In an embodiment, the predetermined first time is longer than the predetermined second time.

As described above, when transmitting data (operation S315 or S319), the transmitter 110 may transmit an initialization control signal at a first level when the number of initializations is less than a threshold value, and may transmit an initialization control signal at a second level when the number of initializations is equal to or greater than the threshold value.

Figure 11:
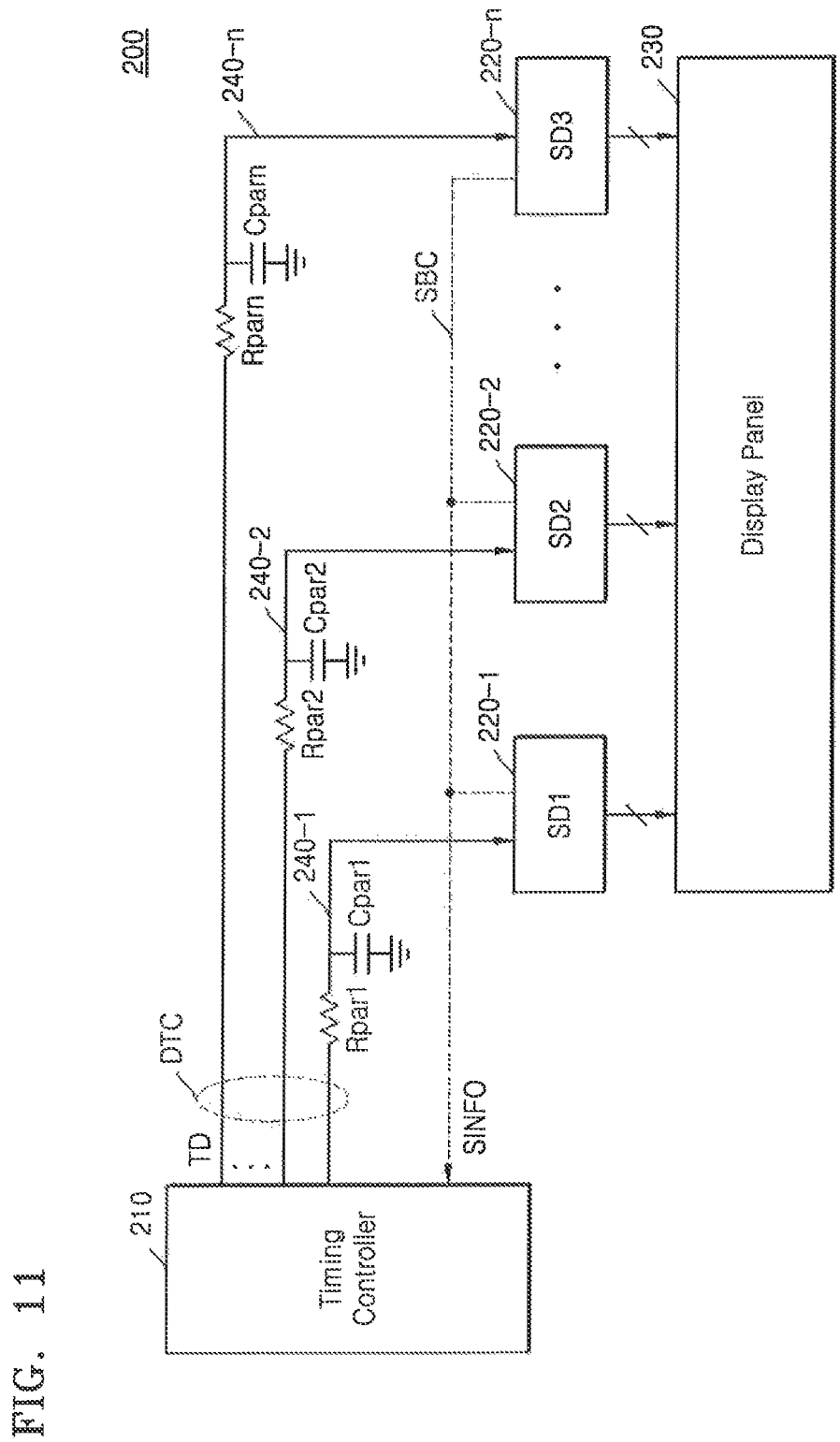
FIG. 11 is a block diagram of a display device according to an exemplary embodiment of the inventive concept.

FIG. 11 is a block diagram of a display device 200 according to an exemplary embodiment of the inventive concept.

Referring to FIG. 11, the display device 200 includes a display driving circuit including a timing controller 210 and a plurality of source drivers 220-1 to 220-n, that is, first to n-th drivers 220-1 to 220-n, and a display panel 230. The transmitter 110 or 110a of the transmitting and receiving system 100 or 100a described with reference FIGS. 1 to 10 may be applied to the timing controller 210, and the receiver 120 or 120a and method of operating the receiver 120 or 120a may be applied to the plurality of source drivers 220-1 to 220-n. For example, the timing controller 210 may include the transmitter 110 or 110a to transmit data to the source drivers 220-1 to 220-n and each source driver may include the receiver 120 or 12a to receive the transmitted data. A method of operating the transmitting and receiving system 100 or 100a may be applied as methods of operating the timing controller 210 and the plurality of the source drivers 220-1 to 220-n. Accordingly, the plurality of source drivers 220-1 to 220-n may selectively perform partial initialization or full initialization.

Referring to FIG. 11, the timing controller 210 may be connected to the plurality of source drivers 220-1 to 220-n in a point-to-point manner. The timing controller 210 transmits data to the first source driver 220-1 through a first transmission channel 240-1 and transmits data to the second source driver 220-2 through a second transmission channel 240-2. The first transmission channel to n-th transmission channel 240-1 to 240-n may be referred to as a data transmission channel DTC.

The lengths of the first to n-th transmission channels 240-1 to 240-n may be different from one another. Accordingly, parasitic resistances Rpar1 to Rparn of the first to n-th transmission channels 240-1 to 240-n may be different from one another, and parasitic capacitances Cpar1 to Cparn of the first to n-th transmission channels 240-1 to 240-n may be different from one another. When these differences occur, impedance and frequency characteristics of the first to n-th transmission channels 240-1 to 240-n are different from one another, and thus, each of the plurality of source drivers 220-1 to 220-n may need to perform DC training and AC training to compensate for signal distortion due to the impedance and frequency characteristics of a transmission channel corresponding thereto. Accordingly, optimization values (for example, variable resistances, an offset voltage value, and an equalization coefficient (see FIGS. 5 and 6) of elements included in a receiving unit (not shown) of each of the plurality of source drivers 220-1 to 220-n may be different from one another.

When performing full initialization, each of the plurality of source drivers 220-1 to 220-n may perform DC training according to the impedance and frequency characteristics of a transmission channel corresponding thereto and AC training according to a received training pattern. When performing partial initialization, each of the plurality of source drivers 220-1 to 220-n may perform AC training according to a received training pattern. When the plurality of source drivers 220-1 to 220-n selectively performs full initialization or partial initialization, the plurality of source drivers 220-1 to 220-n may minimize a time that is required for initialization and improve receiving efficiency. Accordingly, the transmitting and receiving characteristics of the display driving circuit may be improved.

The plurality of source drivers 220-1 to 220-n may be connected to the timing controller 210 in a multi-drop manner through a shared back channel SBC. The plurality of source drivers 220-1 to 220-n may transmit a state information signal SINFO to the timing controller 210 through the shared back channel SBC. In an exemplary embodiment, when a state information signal SINFO at a second level, for example, a logic high, is received, the timing controller 210 determines that the plurality of source drivers 220-1 to 220-n are in a state in which data can be received, and then transmits data to each of the plurality of source drivers 220-1 to 220-n through the data transmission channel DTC. In an exemplary embodiment, when a state information signal SINFO at a first level, for example, a logic low, is received, the timing controller 210 determines that the plurality of source drivers 220-1 to 220-n are in a state in which data cannot be received. In this case, the timing controller 210 transmits a training pattern to each of the plurality of source drivers 220-1 to 220-n through the data transmission channel DTC so that a plurality of source drivers 220-1 to 220-n perform initialization.

The display panel 230 may be driven by the plurality of source drivers 220-1 to 220-n, thereby displaying an image. For example, the display panel 230 may be a liquid crystal display panel, an organic light emitting display panel, a plasma display panel, etc.

Figure 12:
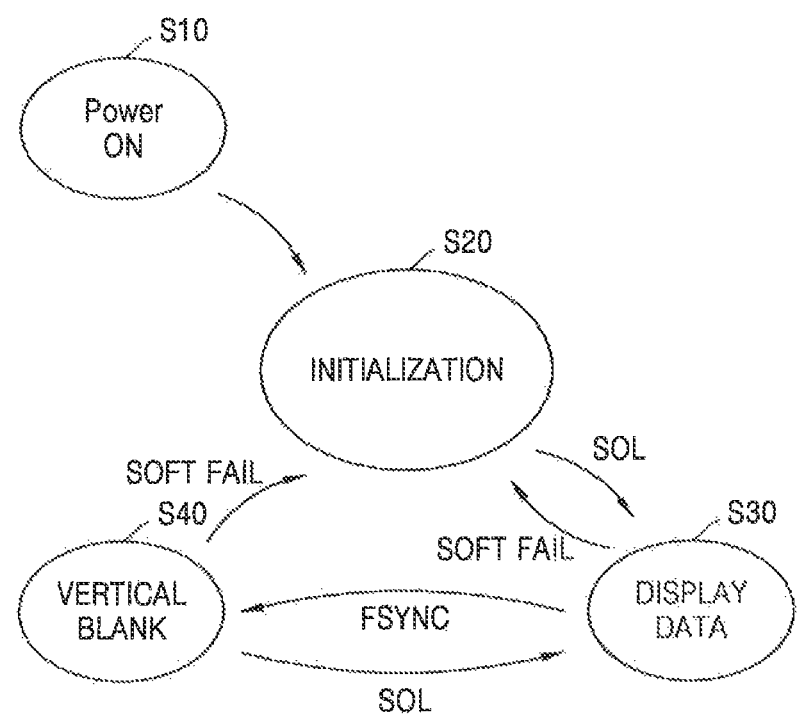
FIG. 12 is a state diagram illustrating operation modes of a display driving circuit of FIG. 11.

FIG. 12 is a state diagram illustrating operation modes of the display driving circuit of FIG. 11.

Referring to FIGS. 11 and 12, the display driving circuit includes an initialization mode S20, a display data mode S30, and a vertical blank mode S40. The initialization mode S20 may include a full initialization mode and a partial initialization mode. When the display driving circuit (for example, the timing controller 210 and the plurality of source drivers 220-1 to 220-n) is powered on (S10), the display driving circuit operates in the initialization mode S20. The display driving circuit may operate in a full initialization mode during the initialization mode S20. Accordingly, each of the plurality of source drivers 220-1 to 220-n may perform DC training and AC training, based on a training pattern that is provided from the timing controller 210. When the full initialization of the plurality of source drivers 220-1 to 220-n has completed and the plurality of source drivers 220-1 to 220-n are stabilized, the display driving circuit operates in a display data mode S30. The timing controller 210 may inform the plurality of source drivers 220-1 to 220-n of the start of the display data mode S30 by transmitting display data including a line start field SOL to the plurality of source drivers 220-1 to 220-n. The timing controller 210 may transmit data corresponding to each line of an image frame to each of the plurality of source drivers 220-1 to 220-n. The image frame may include image data for the entire display panel 230.

In an embodiment, after the display data corresponding to one image frame is transmitted, the display driving circuit operates in the vertical blank mode S40. In an embodiment, during the vertical blank mode S40, the timing controller 210 does not output image data to the display panel 230. The timing controller 210 may inform the plurality of source drivers 220-1 to 220-n of the end of the display data mode S30 by transmitting display data including a frame synchronization signal FSYNC to the plurality of source drivers 220-1 to 220-n. In an embodiment, during the vertical blank mode S40, the display driving circuit operates in a vertical training mode. The timing controller 210 may transmit a training pattern to each of the plurality of source drivers 220-1 to 220-n, and each of the plurality of source drivers 220-1 to 220-n may perform partial initialization, based on the training pattern. In an embodiment, the plurality of source drivers 220-1 to 220-n perform full initialization whenever the vertical training mode is repeatedly performed M times (where M is an integer that is equal to or greater than 2).

The display data mode S30 and the vertical blank mode S40 may be repeatedly performed for each image frame. The display data mode S30 and the vertical blank mode S40 may be repeatedly performed until the power of the display driving circuit is turned off or a soft fail (e.g., a soft failure) occurs in one of the plurality of source drivers 220-1 to 220-n. In an embodiment, after the operation mode of the display driving circuit is changed from the vertical blank mode S40 to the display data mode S30, the timing controller 210 transmits display data including a line start field SOL to the plurality of source drivers 220-1 to 220-n. In an embodiment, after the operation mode of the display driving circuit is changed from the display data mode S30 to the vertical blank mode S40, the timing controller 210 transmits display data including a frame synchronization signal FSYNC to the plurality of source drivers 220-1 to 220-n. When a soft fail occurs in at least one of the plurality of source drivers 220-1 to 220-n while the display data mode S30 or the vertical blank mode S40 is performed, for example, a CDR circuit (for example, the CDR circuit 125 of FIG. 3) included in a receiving unit of each of the plurality of source drivers 220-1 to 220-n is in an unlock state or an inner setting value of the receiving unit is changed due to an electro-static discharge (ESD), the initialization mode S20 may be performed again. In the initialization mode S20, the plurality of source drivers 220-1 to 220-n selectively perform full initialization or partial initialization. In an embodiment, the plurality of source drivers 220-1 to 220-n perform full initialization or partial initialization, based on the level of an initialization control signal that is provided from the timing controller 210. In an embodiment, the plurality of source drivers 220-1 to 220-n count the number of initializations and perform full initialization or partial initialization based on the counted number.

Figure 13:
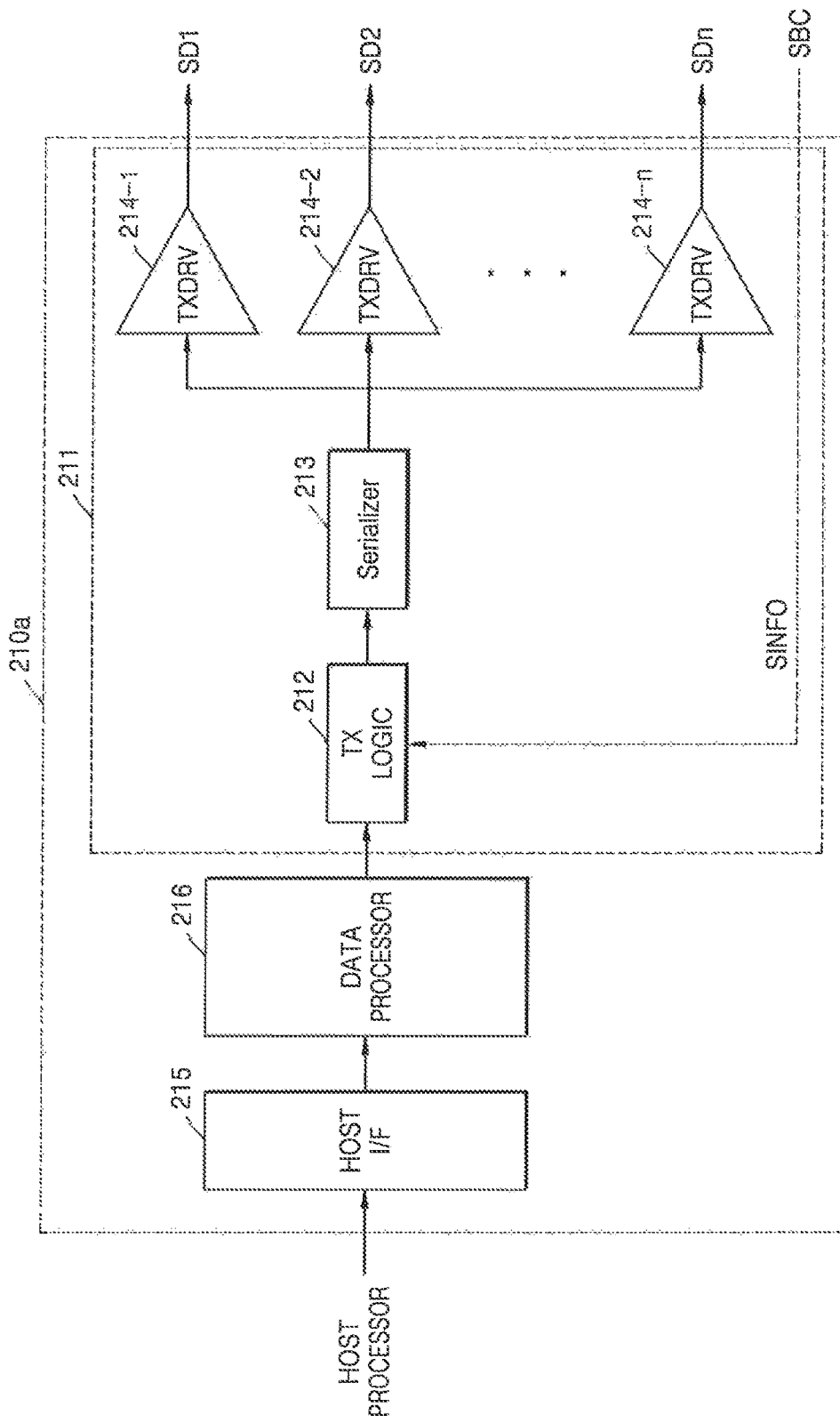
FIG. 13 is a block diagram of a timing controller according to an exemplary embodiment of the inventive concept.

FIG. 13 is a block diagram of a timing controller 210a according to an exemplary embodiment of the inventive concept. The timing controller 210 of FIG. 11 may be implemented by the timing controller 210a of FIG. 13.

Referring to FIG. 13, the timing controller 210a includes a host interface 215, a data processor 216, and a transmitter 211.

The host interface 215 may communicate with an external device, for example, a host processor, and receive a control signal and display data from the host processor.

The data processor 216 may perform various image processing operations on received display data. For example, the data processor 216 may change display data to compensate for the picture quality of an image, which is displayed on a display panel (for example, the display panel 230 of FIG. 11), according to the characteristics of the display panel 230. Alternatively, the data processor 216 may change display data to correspond to the type of the display panel 230. For example, when the display panel 230 has a pixel structure having a PenTile scheme in which a red pixel, a green pixel, and a blue pixel are repeated by units of lines, the data processor 216 may change display data so that the display data corresponds to the pixel structure having the PenTile scheme.

The transmitter 211 may divide image-processed display data into a plurality of pieces of data and transmit the plurality of pieces of data to source drivers. In an embodiment, the plurality of pieces of data have a packet form. The transmitter 211 includes a transmission logic 212, a serializer 213, and a plurality of transmission drivers 214-1 to 214-n.

The transmission logic 212 may generate transmission data to be transmitted to each of the plurality of source drivers SD1 to SDn through a data transmission channel (for example, DTC of FIG. 11). The transmission logic 212 may generate transmission data having a packet form, which includes display data, various control signals, and an error detection signal. When a state information signal SINFO that is transmitted from the plurality of source drivers SD1 to SDn through the shared back channel SBC indicates an abnormal state in which data cannot be received, the transmission logic 212 may control the plurality of transmission drivers 214-1 to 2140n so that the plurality of transmission drivers 214-1 to 2140n transmit a training pattern for the initialization of the plurality of source drivers SD1 to SDn.

In an embodiment, the transmission logic 212 sets the level of an initialization control signal for controlling the initialization of the plurality of source drivers SD1 to SDn. The transmission logic 212 may count the number of abnormal state occurrences. In an embodiment, when the counted number is less than a threshold value, the transmission logic 212 transmits an initialization control signal INIT at a logic low when transmitting data, and when the counted number is equal to or greater than the threshold value, the transmission logic 212 transmits an initialization control signal INIT at a logic high when transmitting data. In an embodiment, the transmission logic 212 counts the number of abnormal states that have occurred within a preset time period, and sets the level of the initialization control signal INIT to a logic high when the counted number is equal to or greater than a threshold value. In an embodiment, the transmission logic 212 resets the counted number for each time period. In an embodiment, the transmission logic 212 changes the level of the initialization control signal INIT whenever the initialization control signal INIT is transmitted. For example, after an initialization control signal INIT at a first level is transmitted, the level of a next initialization control signal INIT is set to a second level when the next initialization control signal INIT is transmitted. In another example, after an initialization control signal INIT at a second level is transmitted, the level of a next initialization control signal INIT is set to a first level when the next initialization control signal INIT is transmitted.

The serializer 213 converts transmission data transmitted in parallel from the transmission logic 212 into serial data.

Each of the plurality of transmission drivers 214-1 to 214-n may be connected to a source driver corresponding thereto among the plurality of source drivers SD1 to SDn in a point-to-point manner. Each of the plurality of transmission drivers 214-1 to 214-n may transmit serialized transmission data to a source driver corresponding thereto through the data transmission channel (for example, DTC of FIG. 11).

Figure 14:
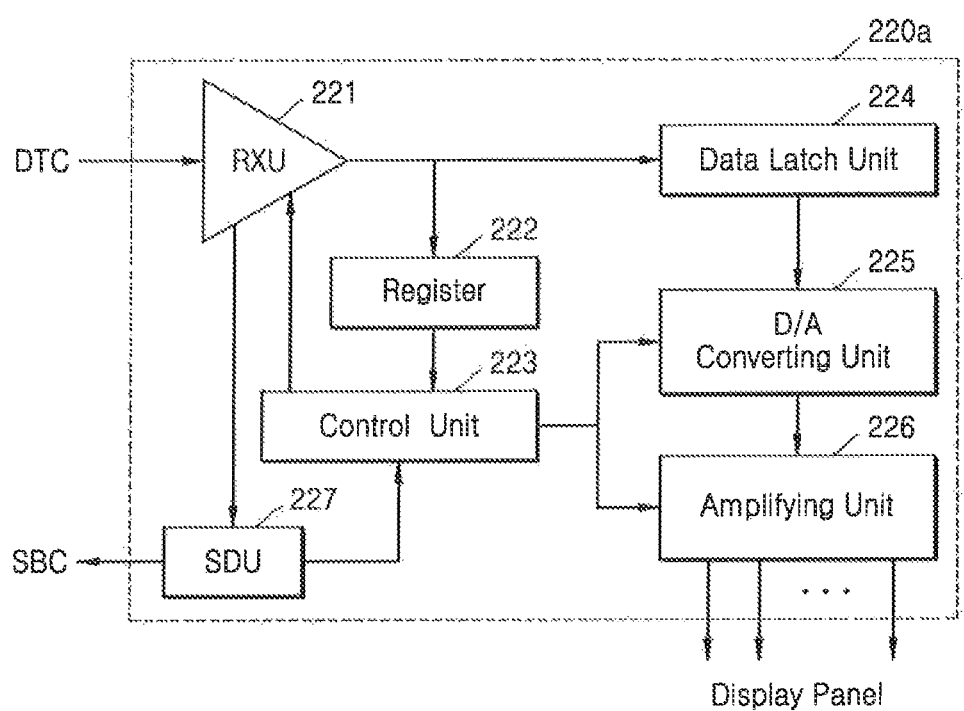
FIG. 14 is a block diagram of a source driver according to an exemplary embodiment of the inventive concept.

FIG. 14 is a block diagram of a source driver 220a according to an exemplary embodiment of the inventive concept.

The source driver 220a may be used to implement each of the plurality of source drivers 220-1 to 220-n of FIG. 11.

Referring to FIG. 14, the source driver 220a includes a receiving unit 221, a register 222, a control unit 223, a state-transmitting unit 227, a data latch unit 224, a digital to analog (D/A) converting unit 225 (e.g., a D/A converter), and an amplifying unit 226 (e.g., an amplifier such as an OP-AMP).

The receiving unit 221 may receive data from a timing controller (for example, the timing controller 210 of FIG. 1) through a data transmission channel DTC. In this case, the receiving unit 221 may receive serial data and convert the received serial data into parallel data. Among received data, image data may be provided to the data latch unit 224 and configuration data for controlling the source driver 220a may be provided to the register 222. The data latch unit 224 stores image data. In an embodiment, the data latch unit 224 includes a shift register. The shift register may shift image data provided thereto to generate shifted image data and store the shifted image data. When image data corresponding to pixels of one row of a display panel (for example, the display panel 230 of FIG. 11) is stored in the data latch unit 224, the data latch unit 224 may provide image data stored therein to the A/D converting unit 225. The A/D converting unit 225 may select a gradation voltage based on the image data to generate an analog signal, and may provide the analog signal to the amplifying unit 226. The amplifying unit 226 may amplify the analog voltage and provide an amplified analog voltage to a data line of the display panel 230.

The control unit 223 may control the overall operation of the source driver 220a. The control unit 223 may control operations of other elements of the source driver 220a, for example, the data latch unit 224, the D/A converting unit 225, the amplifying unit 226, and the receiving unit 221, based on the configuration data stored in the register 222. In particular, the control unit 223 may control an initialization operation of the receiving unit 221. In an embodiment, after power is applied to the source driver 220a, the control unit 223 controls the receiving unit 221 so that the receiving unit 221 performs full initialization, and then controls the initialization of the receiving unit 221 in response to an abnormal state signal, for example, a soft fail signal, which is provided from the state-transmitting unit 227. In an embodiment, the control unit 223 controls the receiving unit 221 so that the receiving unit 221 performs one selected from full initialization and partial initialization based on an initialization control signal of previously transmitted configuration data.

The state-transmitting unit 227 may generate a soft fail signal when a CDR circuit included in the receiving unit 221 is in an unlock state or an internal setting value of the receiving unit 221 or the configuration data stored in the register 222 is changed due to an ESD. The state-transmitting unit 227 may transmit the soft fail signal to the timing controller 220 through a shared back channel SBC.

Figure 15A:
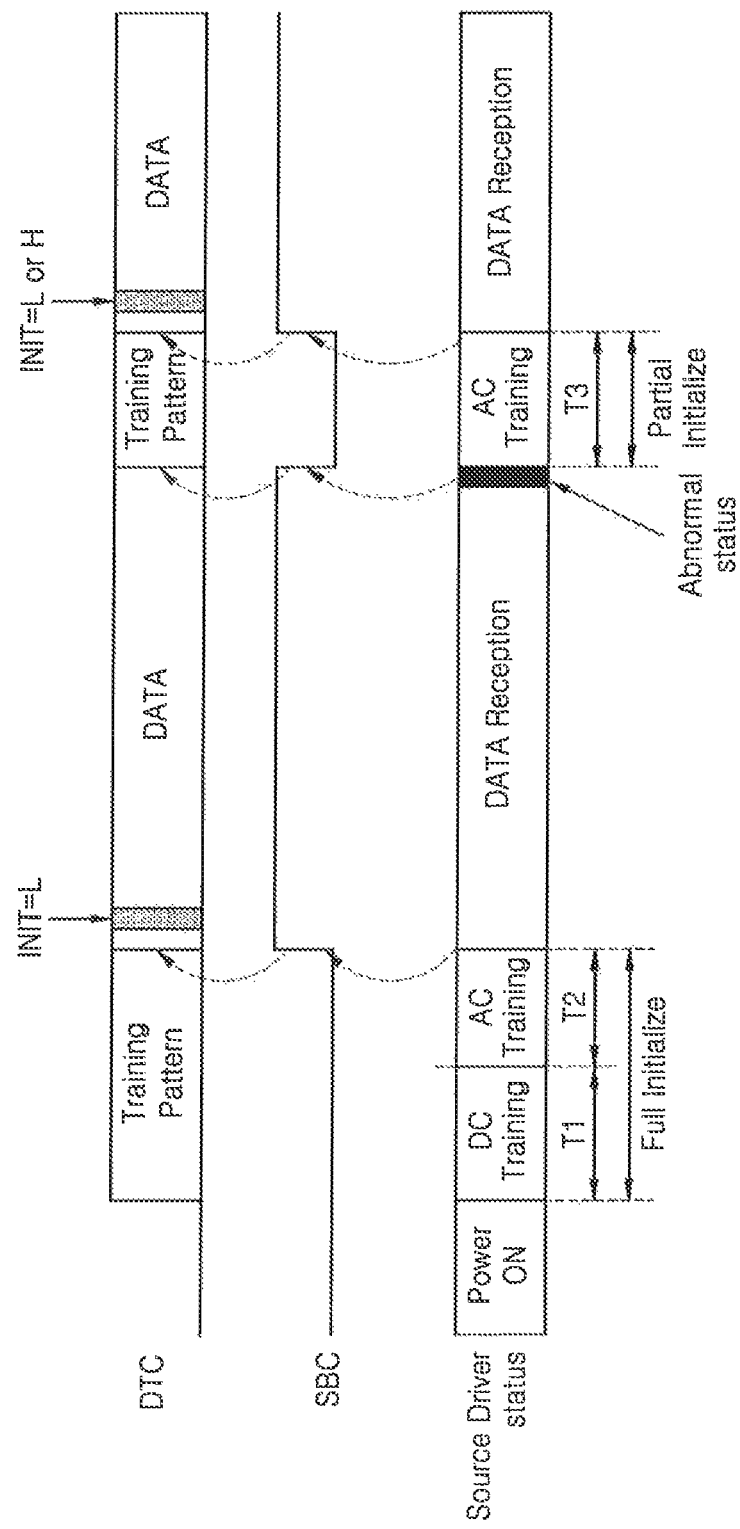

FIGS. 15A and 15B are timing diagrams illustrating a status of the source driver 220a of FIG. 14 and states of transmission channels. FIG. 15A illustrates full initialization and partial initialization after the source driver 220*a* is powered on, and FIG. 15B illustrates full initialization of the source driver 220*a*.

Referring to FIG. 15A, when power is applied to the source driver 220*a*, a training pattern is transmitted through the data transmission channel DTC and the source driver 220*a* performs full initialization. The source driver 220*a* may perform DC training during a period T1, and then may perform AC training during a period T2. In an embodiment, the period T2 is shorter than the period T1. Since DC training and AC training have been described in detail with reference to FIGS. 3 to 8B, detailed descriptions thereof are omitted. When full initialization has completed, the source driver 220*a* may indicate a state, in which initialization has been completed and data can be received, by changing the level of a signal that is transmitted through the shared back channel SBC, for example, a state information signal, from a first level to a second level. Accordingly, data may be transmitted through the data transmission channel DTC, and the source driver 220*a* may receive the data. In this case, the transmitted data may include an initialization control signal INIT. The level of the initialization control signal INIT may be a first level, for example, a logic low.

When an abnormal state occurs in the source driver 220*a*, the source driver 20*a* may inform a timing controller (for example, the timing controller 210 of FIG. 11) that an abnormal state in which the source driver 220*a* cannot receive data has occurred, by changing the level of a state information signal, which is transmitted through the shared back channel SBC, from a second level to a first level. Accordingly, a training pattern may be transmitted through the data transmission channel DTC, and the source driver 220*a* may perform initialization. As shown in FIG. 15A, when an initialization control signal included in previously transmitted data is a logic low (L), the source driver 220*a* performs partial initialization. The source driver 220*a* performs partial initialization during a period T3. The period T3 may be equal to the period T2 or be shorter than the period T2.

When initialization has completed, the source driver 220*a* may indicate a state, in which initialization has been completed and data may be received, by changing the level of a signal, which is transmitted through the shared back channel SBC, from a first level to a second level. Accordingly, data may be transmitted through the data transmission channel DTC, and the source driver 220*a* may receive the data. In this case, the transmitted data may include an initialization control signal INIT. The level of the initialization control signal INIT may be a first level, for example, a logic low (L), or a second level, for example, a logic high (H). As described with reference to FIG. 13, the level of the initialization control signal INIT may be determined by the timing controller (for example, the timing controller 210 of FIG. 11). Thereafter, when an abnormal state occurs, the source driver 220*a* may selectively perform partial initialization or full initialization according to the level of the initialization control signal INIT.

Referring to FIG. 15B, after partial initialization has been performed, data that is received through the data transmission channel DTC may include an initialization control signal INIT at a logic high (H). When an abnormal state occurs in the source driver 220*a*, the source driver 220*a* may inform the timing controller of the occurrence of the abnormal state through the shared back channel SBC. Accordingly, a training pattern may be transmitted through the data transmission channel DTC, and the source driver 220*a* may perform initialization. In this case, since the level of an initialization control signal included in previously transmitted data is logic high (H), the source driver 220*a* may perform full initialization. The source driver 220*a* performs DC training during the period T1, and performs AC training during the period T2 based on a received training pattern. After full initialization has completed, the source driver 220*a* may receive data, and the received data may include an initialization control signal at a logic low (L).

Figure 16:
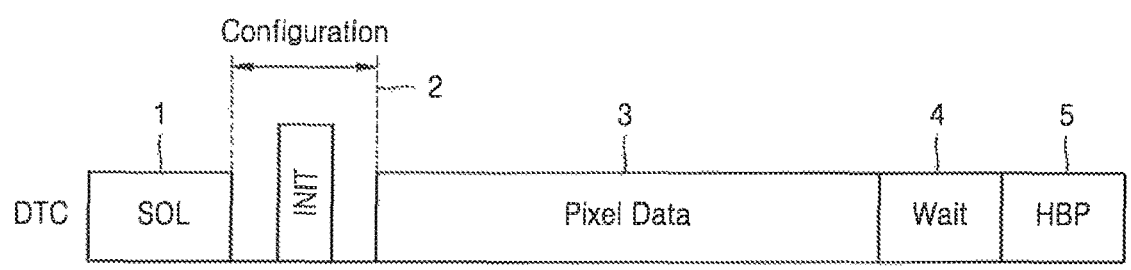
FIG. 16 illustrates an example of transmission data that is transmitted to a source driver through a data transmission channel.

FIG. 16 illustrates an example of transmission data that is transmitted to a source driver through a data transmission channel.

Referring to FIG. 16, the transmission data is packet-type data. A data packet of the transmission data includes a line start field 1, a configuration field 2, a pixel data field 3, a wait field 4, and a horizontal gap field 5.

The line start field 1 indicates the start of each line of an image frame. The source driver may operate an internal counter in response to the line start field, and thus may identify the configuration field 2, the pixel data field 3, and the wait field, based on a counting result of the internal counter. The line start field 1 may include a code having a specific edge or pattern to distinguish the line start field 1 from the horizontal gap field 5 for a previous line of the current image frame or a vertical blank period between the current image frame and a previous image frame.

The configuration field 2 may include configuration data for controlling the source driver. The configuration data may include a frame synchronization signal that is activated when a data packet for a last line of an image frame is transmitted. When an activated frame synchronization signal is received, the source driver may recognize that a vertical blank period starts after the current data packet is received. In an exemplary embodiment, the configuration data includes an initialization control signal INIT. The source driver may selectively perform partial initialization and full initialization when an abnormal state occurs, based on the initialization control signal INIT.

The pixel data field 3 may include image data. The pixel data field 3 may further include CRC data for detecting an error.

The wait field 4 is a section allocated to secure a time for which the source driver receives and stores image data. For example, the wait field 4 may have the number of bits corresponding to a time for which the source driver receives image data and stores the received image data in a data latch unit (for example, the data latch unit 224 of FIG. 14).

The horizontal gap field 5 is a section allocated to secure a time for which the source driver drives a display panel based on image data. For example, the horizontal gap field 5 may be used to convert image data stored in the data latch unit into an analog voltage, and may have the number of bits corresponding to a time during which the source driver applies the analog voltage to a display panel.

Figure 17:
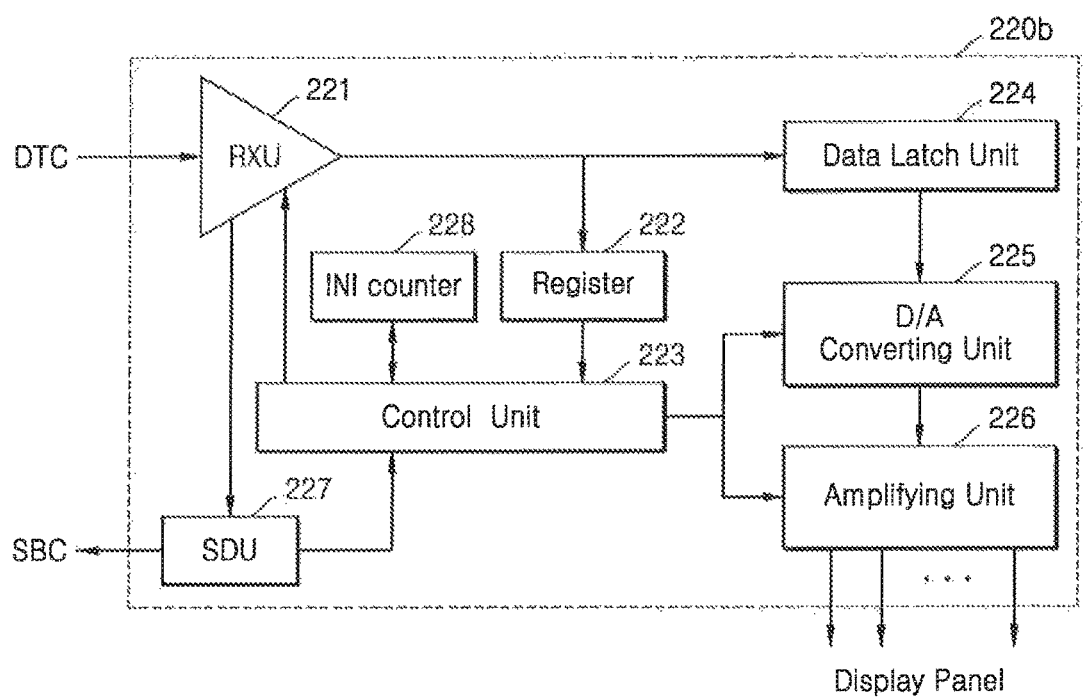
FIG. 17 is a block diagram of a source driver according to an exemplary embodiment of the inventive concept.

FIG. 17 is a block diagram of a source driver 220*b* according to an exemplary embodiment of the inventive concept.

The configuration of the source driver 220*b* of FIG. 17 is similar to that of the source driver 220*a* of FIG. 14. However, the source driver 220*b* of FIG. 17 further includes an initialization counter 228. The initialization counter 228 may count the number of abnormal state occurrences or the number of initializations. In an embodiment, the initialization counter 228 counts the number of abnormal states that have occurred during a preset time period or the number of initializations. The initialization counter 228 may reset the counted number for each time period.

In an embodiment, when the number counted by the initialization counter 228 is equal to or less than a threshold value, a control unit 223 controls a receiving unit 221 so that the receiving unit 221 performs partial initialization. In an embodiment, when the number counted by the initialization counter 228 exceeds the threshold value, the control unit 223 controls the receiving unit 221 so that the receiving unit 221 performs full initialization.

In this manner, the source driver 220b of FIG. 17 may control an initialization mode of the receiving unit 221 by internally counting the number of abnormal state occurrences or the number of initializations.

Figure 18A:
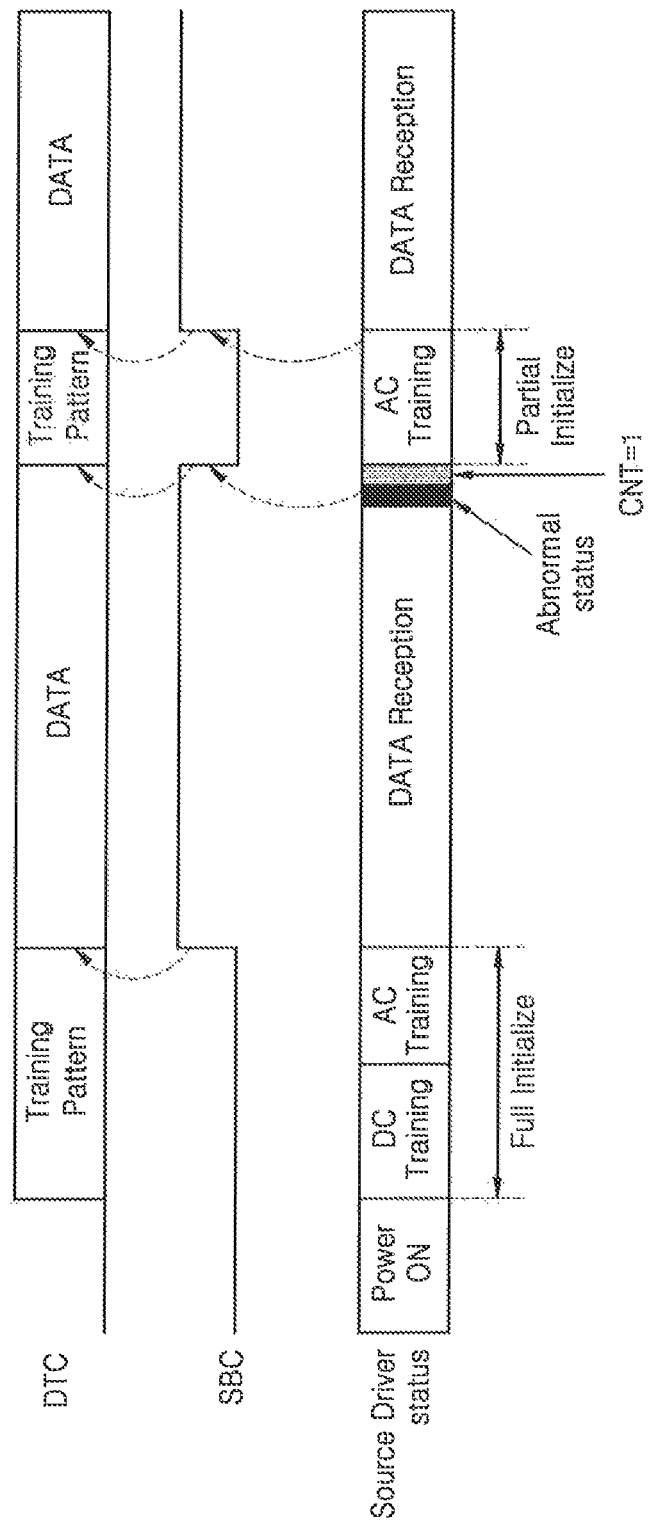
FIGS. 18A and 18B are timing diagrams illustrating a status of the source driver of FIG. 17 and states of transmission channels.
Figure 18B:
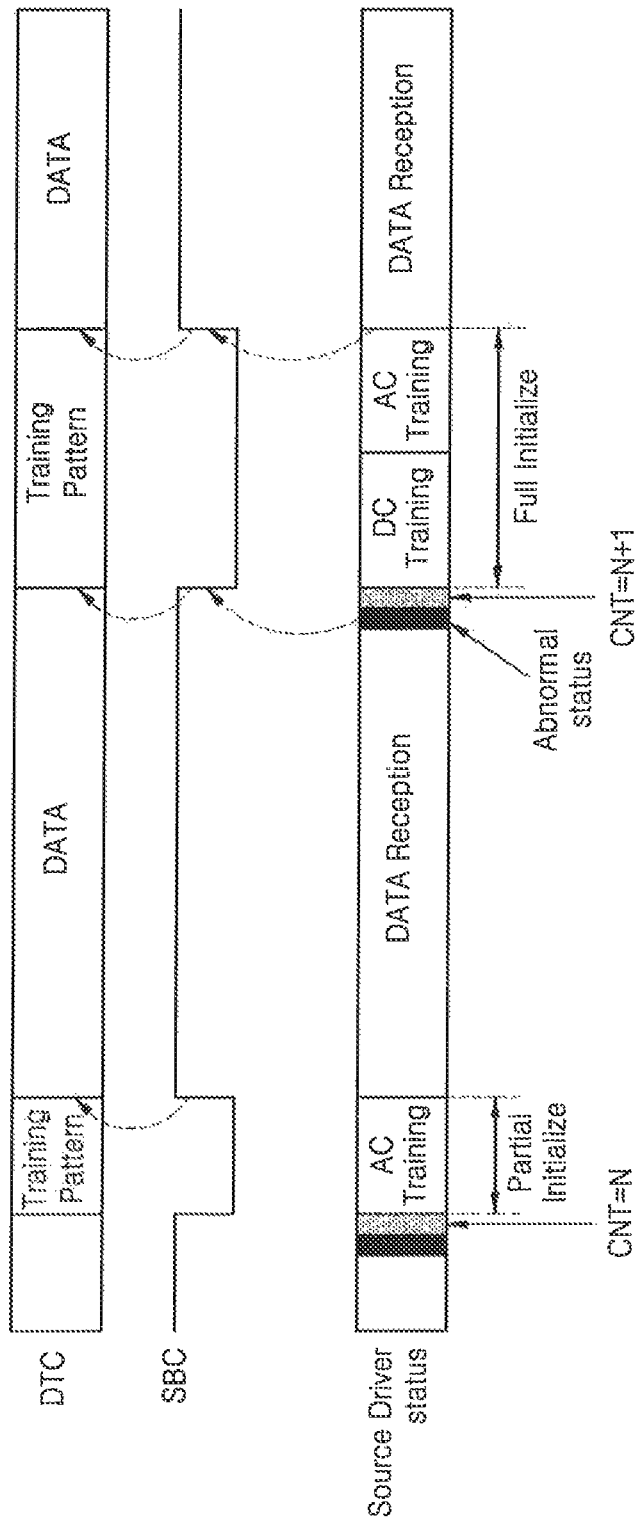

FIGS. 18A and 18B are timing diagrams illustrating a status of the source driver 220b of FIG. 17 and states of transmission channels. FIG. 18A illustrates full initialization and partial initialization after the source driver 220b is powered on, and FIG. 18B illustrates full initialization of the source driver 220b.

Referring to FIG. 18A, when power is applied to the source driver 220b, a first training pattern is transmitted through the data transmission channel DTC and the source driver 220b performs full initialization in response to the first training pattern. When full initialization has completed, the source driver 220b may indicate a state in which data can be received through the shared back channel SBC. Accordingly, data may be transmitted through the data transmission channel DTC, and the source driver 220b may receive the data.

When an abnormal state occurs in the source driver 220b, the source driver 220b may inform a timing controller of the occurrence of an abnormal state through the shared back channel SBC. The source driver 220b may increase a counting value CNT of an initialization counter (e.g., counter 228). Since an abnormal state has initially occurred after the power-on, the counting value CNT is set to "1". When a training pattern is transmitted through the data transmission channel DTC, the source driver 220b may perform initialization based on the counting value CNT. Since the counting value CNT is "1" that is equal to or less than a threshold value, the source driver 220b performs partial initialization.

Referring to FIG. 18B, when a threshold value is "N", the source driver 220b performs partial initialization until the counting value CNT is set to "N". Thereafter, when an abnormal state occurs while data is received, the counting value CNT may be "N+1" that exceeds the threshold value. Since the counting value CNT exceeds the threshold value, the source driver 220b performs full initialization the next time a training pattern is transmitted through the data transmission channel DTC. In an embodiment, the counting value CNT is reset after performing the full initialization.

Figure 19:
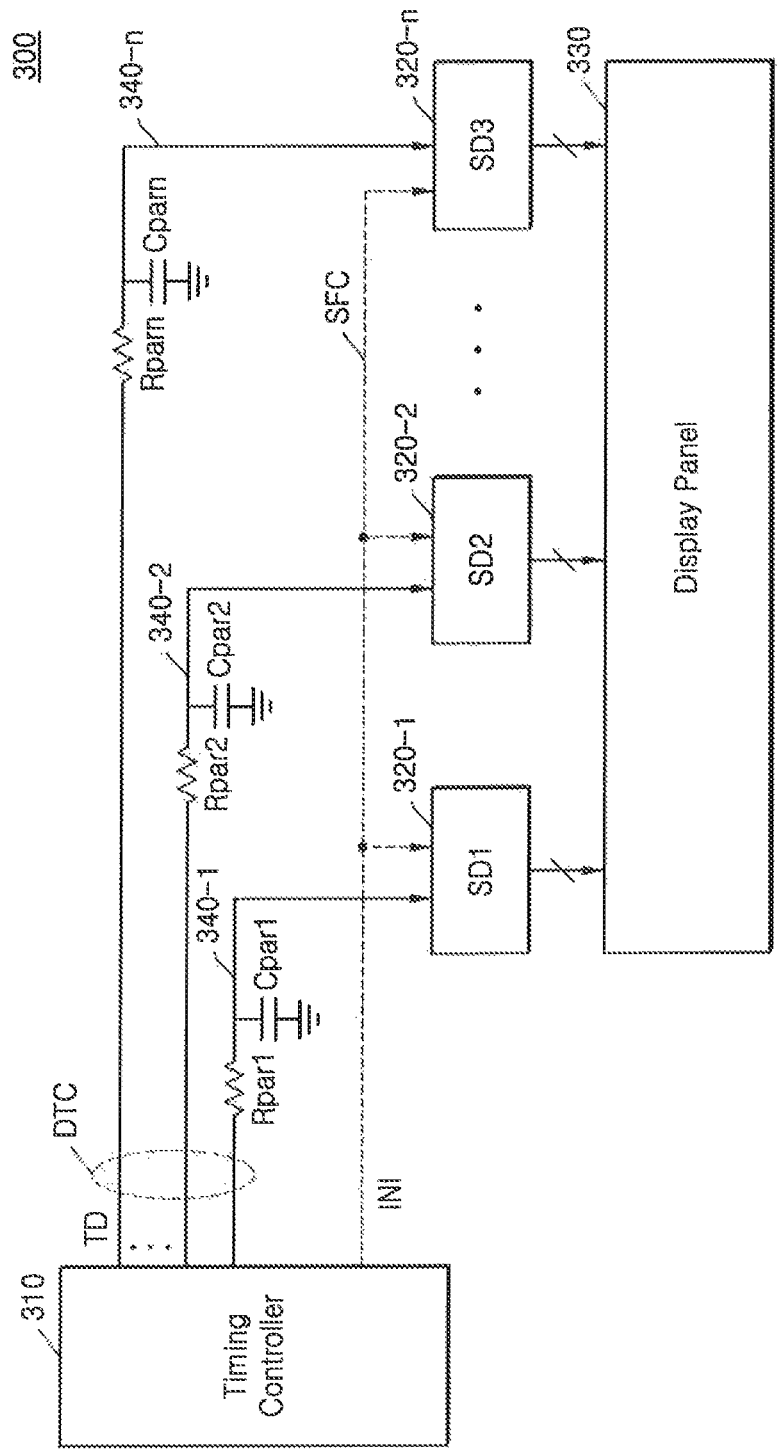
FIG. 19 is a block diagram of a display device according to an exemplary embodiment of the inventive concept.

FIG. 19 is a block diagram of a display device 300 according to an exemplary embodiment of the inventive concept.

Referring to FIG. 19, the display device 300 includes a display driving circuit including a timing controller 310 and a plurality of source drivers 320-1 to 320-n and a display panel 330

The configuration and operation of the display circuit 300 of FIG. 19 are similar to those of the display device 200 of FIG. 11. The plurality of source drivers 320-1 to 320-n selectively perform one selected from partial initialization and full initialization.

In the display device 300 of FIG. 19, the timing controller 310 is connected to the plurality of source drivers 320-1 to 320-n through a shared forward channel SFC. The timing controller 310 may transmit a state information signal SINFO to the plurality of source drivers 320-1 to 320-n through the shared forward channel SFC. For example, the state information signal SINFO indicates a state in which data can be transmitted or a state in which data cannot be transmitted. When the state information signal SINFO that is transmitted through the shared forward channel SFC is at a first level, for example, a logic low, the state information signal SINFO indicates a state in which data cannot be transmitted, and the source drivers 320-1 to 320-n performs initialization in response to the state information signal SINFO. When the state information signal SINFO is at a second level, for example, a logic high, the state information signal SINFO indicates a state in which data can be transmitted, and the source drivers 320-1 to 320-n receive data in response to the state information signal SINFO.

Figure 20:
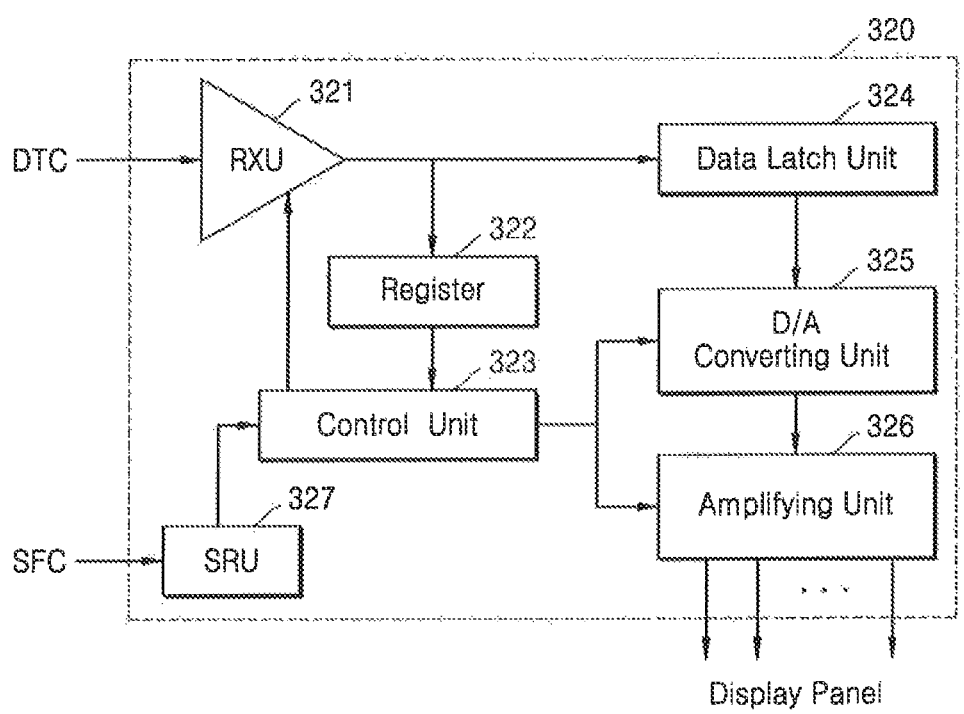
FIG. 20 is a block diagram of a source driver according to an exemplary embodiment of the inventive concept.

FIG. 20 is a block diagram of a source driver 320 according to an exemplary embodiment of the inventive concept.

The source driver 320 may be used to implement each of the plurality of source drivers 320-1 to 320-n of FIG. 19.

Referring to FIG. 20, the source driver 310 includes a receiving unit 321 (e.g., a receiver), a register 322, a control unit 323 (e.g., a controller), a state-receiving unit 327 (e.g., a buffer), a data latch unit 324 (e.g., a latch), a digital to analog (D/A) converting unit 325 (e.g., an A/D converter), and an amplifying unit 326 (e.g., amplifier).

The configuration and operation of the source driver 320 of FIG. 20 are similar to those of the source driver 220a of FIG. 14. As compared to the source driver 220a of FIG. 14, the source driver 320 of FIG. 20 includes the state-receiving unit 327 instead of the state-transmitting unit 227. The state-receiving unit 327 receives a state information signal that is received through a shared forward channel SFC. In an embodiment, when the level of the state information signal is a first level, for example, a logic low, the control unit 213 controls the receiving unit 321 so that the receiving unit 321 is initialized. In an embodiment, when the level of the state information signal is a second level, for example, a logic high, the control unit 213 controls the receiving unit 321 so that the receiving unit 321 receives data.

In an embodiment, the control unit 323 controls the receiving unit 321 so that the receiving unit 321 performs one selected from full initialization and partial initialization based on an initialization control signal of previously transmitted configuration data.

Figure 21A:
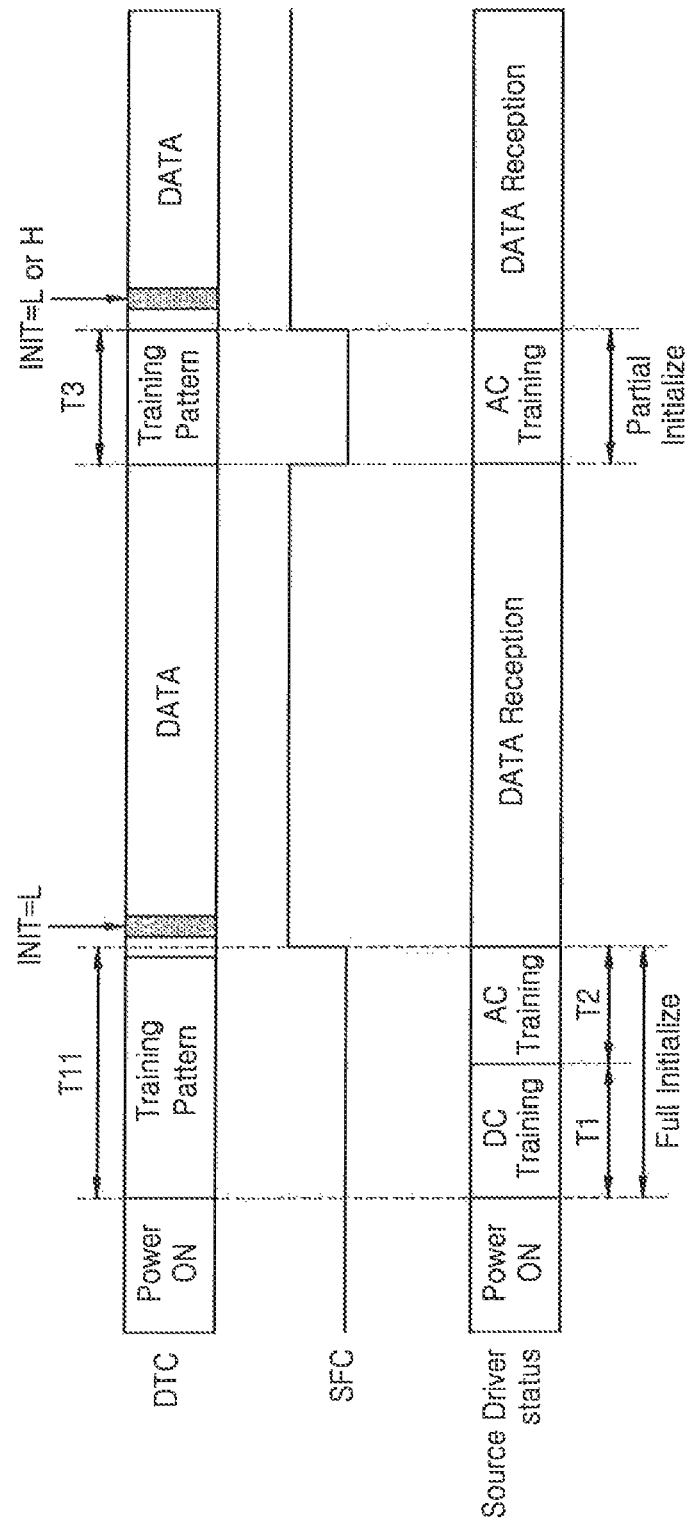
FIGS. 21A and 21B are timing diagrams illustrating a status of the source driver of FIG. 20 and states of transmission channels.
Figure 21B:
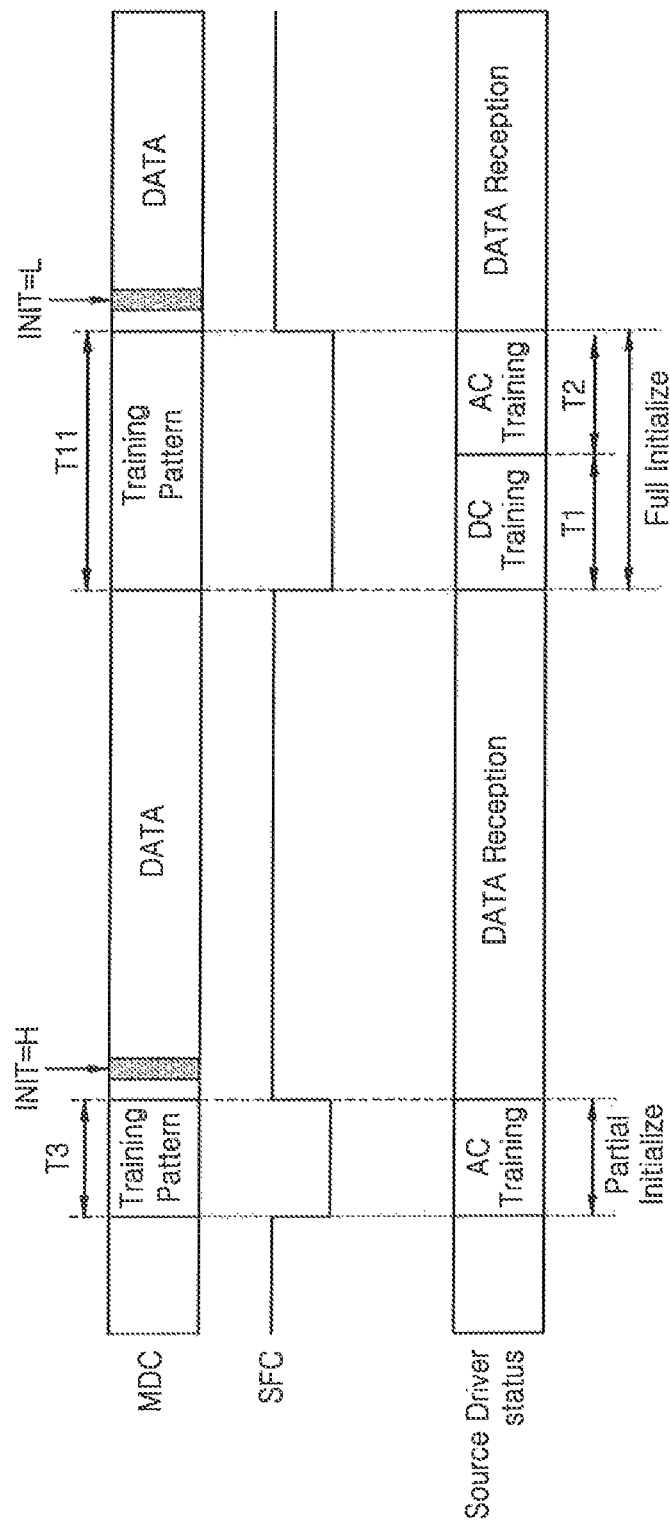

FIGS. 21A and 21B are timing diagrams illustrating a status of the source driver 320 of FIG. 20 and states of transmission channels. FIG. 21A illustrates full initialization and partial initialization after the source driver 320 is powered on, and FIG. 21B illustrates full initialization of the source driver 320.

Referring to FIG. 21A, when power is applied to the source driver 320, a first training pattern is transmitted through the data transmission channel DTC and the source driver 320 performs full initialization in response to the first training pattern. The first training pattern is transmitted during a period T11, and the source driver 320 may perform DC training during a portion of the period T11, for example, a period T1, and may perform AC training during another portion of the period T11, for example, a period T12. The length of the period T11 may be sufficiently set for the source driver 320 to perform DC training and AC training. When the level of a state information signal that is transmitted to the source driver 320 through the shared forward channel SFC is changed from a first level to a second level after the period T11, data may be transmitted through the data transmission channel DTC and the source driver 320 may receive the data. The transmitted data may include an initialization control signal INIT. The level of the initialization control signal INIT may be a first level, for example, a logic low (L).

While the source driver 320 receives data, the state information signal that is received through the shared forward channel SFC may be changed from the second level to the first level, and a second training pattern is transmitted through the data transmission channel DTC. Since the level of an initialization control signal INIT included in previously transmitted data is logic low (L), the source driver 320 performs partial initialization. During a period T3, the second training pattern is transmitted and the source driver 320 performs AC training based on the second training pattern. In an embodiment, the length of the period T3 is shorter than that of the period T11.

As the level of a state information signal that is transmitted to the source driver 320 through the shared forward channel SFC is changed from a first level to a second level after the period T3, initialization may be completed and data may be transmitted. The source driver 320 may receive the transmitted data. In this case, the transmitted data may include an initialization control signal INIT. The level of the initialization control signal INIT may be a first level, for example, logic low (L), or a second level, for example, logic high (H). The level of the initialization control signal INIT may be determined by a timing controller (for example, the timing controller 210 of FIG. 11). Thereafter, when a state information signal that is received through the shared forward channel SFC is changed from a second level to a first level, the source driver 320 may selectively perform partial initialization or full initialization according to the level of the initialization control signal INIT.

Referring to FIG. 21B, after partial initialization has been performed, data that is received through the data transmission channel DTC includes an initialization control signal INIT at a logic high (H). Thereafter, when the level of a state information signal that is received through the shared forward channel SFC is changed from a second level to a first level, the source driver 320 may perform full initialization according to the initialization control signal INIT at a logic high (H). A training pattern is transmitted during a period T11, and the source driver 320 performs DC training during a portion of the period T11, for example, a period T1, and may perform AC training during another portion of the period T11, for example, a period T2. The length of the period T2 may be equal to that of the period T1 or be shorter than that of the period T1. The length of the period T11 may be longer than that of the period T3. After full initialization has completed, the source driver 320 may receive data, and the received data may include an initialization control signal INIT at logic low (L).

Figure 22:
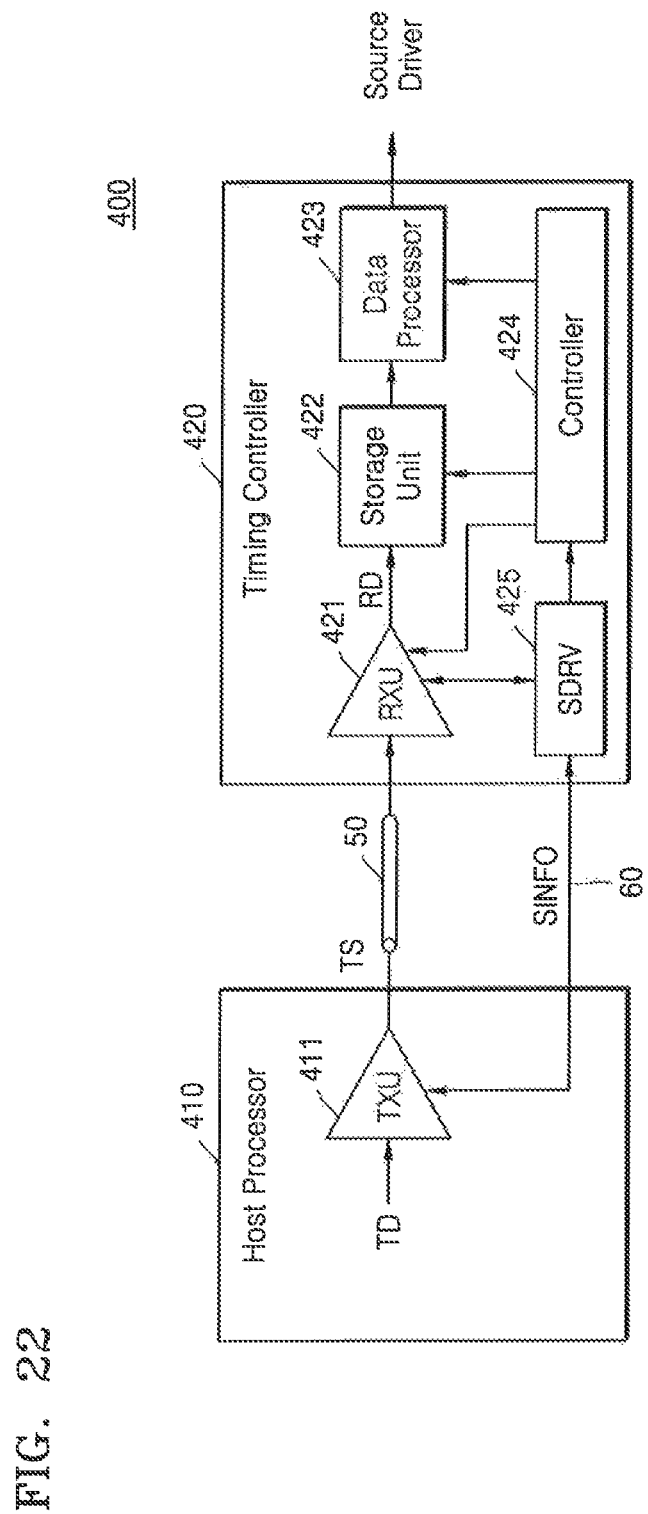
FIG. 22 is a block diagram of a display system according to an exemplary embodiment of the inventive concept.

FIG. 22 is a block diagram of a display system 400 according to an exemplary embodiment of the inventive concept.

Referring to FIG. 22, the display system 400 includes a host processor 410 and a timing controller 420. The transmitter 110 or 110a of the transmitting and receiving system 100 or 100a described above with reference to FIGS. 1 to 10 may be applied to the host processor 410, and the receiver 120 or 120a of the transmitting and receiving system 100 or 100a and the method of operating the receiver 120 or 120a may be applied to the timing controller 420. The method of operating the transmitting and receiving system 100 or 100a may be applied as operating methods of the host processor 410 and the timing controller 420. Accordingly, the timing controller 420 of FIG. 22 may selectively perform one selected from partial initialization and full initialization.

Referring to FIG. 22, the host processor 410 may transmit display data, that is, transmission data TD, to the timing controller 420. For example, the host processor 410 may be an application processor of an electronic device on which the display system 400 is mounted. The host processor 410 includes a transmission unit 411. The transmission unit 411 may convert the transmission data TD into a transmission signal TS according to an interface scheme and characteristics of a data transmission channel 50, and may provide the transmission signal TS to the data transmission channel 50.

In some embodiments, the interface scheme may be one selected from an USI (Universal Serial Interface), a CPU interface, an RGB interface, an MIPI (Mobile Industry Processor Interface), an MDDI (Mobile Display Digital Interface), a CDP (Compact Display Port), an MPL (Mobile Pixel Link), a CMADS (Current Mode Advanced Differential Signaling), an SPI (Serial Peripheral Interface), an I2C (Inter-Integrated Circuit) interface, a DP (Display Port) and eDP (Embedded Display Port) interface, a CCI (Camera Control Interface), a CSI (Camera Serial Interface), an MCU (Micro Controller Unit) interface, and an HDMI (High definition Multimedia Interface). Besides, the interface scheme may be one of various high speed serial interface schemes.

The timing controller 420 may receive data transmitted from the host processor 410, perform an image processing operation on the received data, and provide the image-processed data to a source driver.

The timing controller 420 includes a receiving unit 421, a storage unit 422, a data processor 423, a controller 424, and a state-transmitting unit 425. The receiving unit 421 may receive a transmission signal TS that is transmitted through the data transmission channel 50, and may recover data from the transmission signal TS. Recovered data RD may be stored in the storage unit 422. The data processor 423 may perform various image processing operations on data that is output from the storage unit 422 or the recovered data RD. For example, the data processor 423 may perform an image processing operation for compensating the picture quality of an image or change the data to correspond to the type of a display panel. Image-processed data may be transmitted to a source driver.

The controller 424 may control the overall operation of the timing controller 420. In particular, the controller 424 may control an initialization operation of the receiving unit 421. When power is on, the controller 424 may control the receiving unit 421 so that the receiving unit 421 performs full initialization, and then may control the initialization of the receiving unit 421 in response to an abnormal state signal, for example, a soft fail signal, which is provided from the state-transmitting unit 425.

In an embodiment, the controller 424 may control the receiving unit 221 so that the receiving unit 221 performs one selected from full initialization and partial initialization based on an initialization control signal of control data previously transmitted from the host processor 410.

In an embodiment, the controller 424 internally counts the number of initializations, and controls the receiving unit 421 so that the receiving unit 421 performs one selected from full initialization and partial initialization based on the counted number.

The state-transmitting unit 425 may generate a soft fail signal when a CDR circuit included in the receiving unit 421 is in an unlock state or an internal setting value of the receiving unit 421 is changed due to an ESD. The state-transmitting unit 425 may transmit the soft fail signal to the transmission unit 411 of the host processor 410 through a state transmission channel 60.

Figure 23:
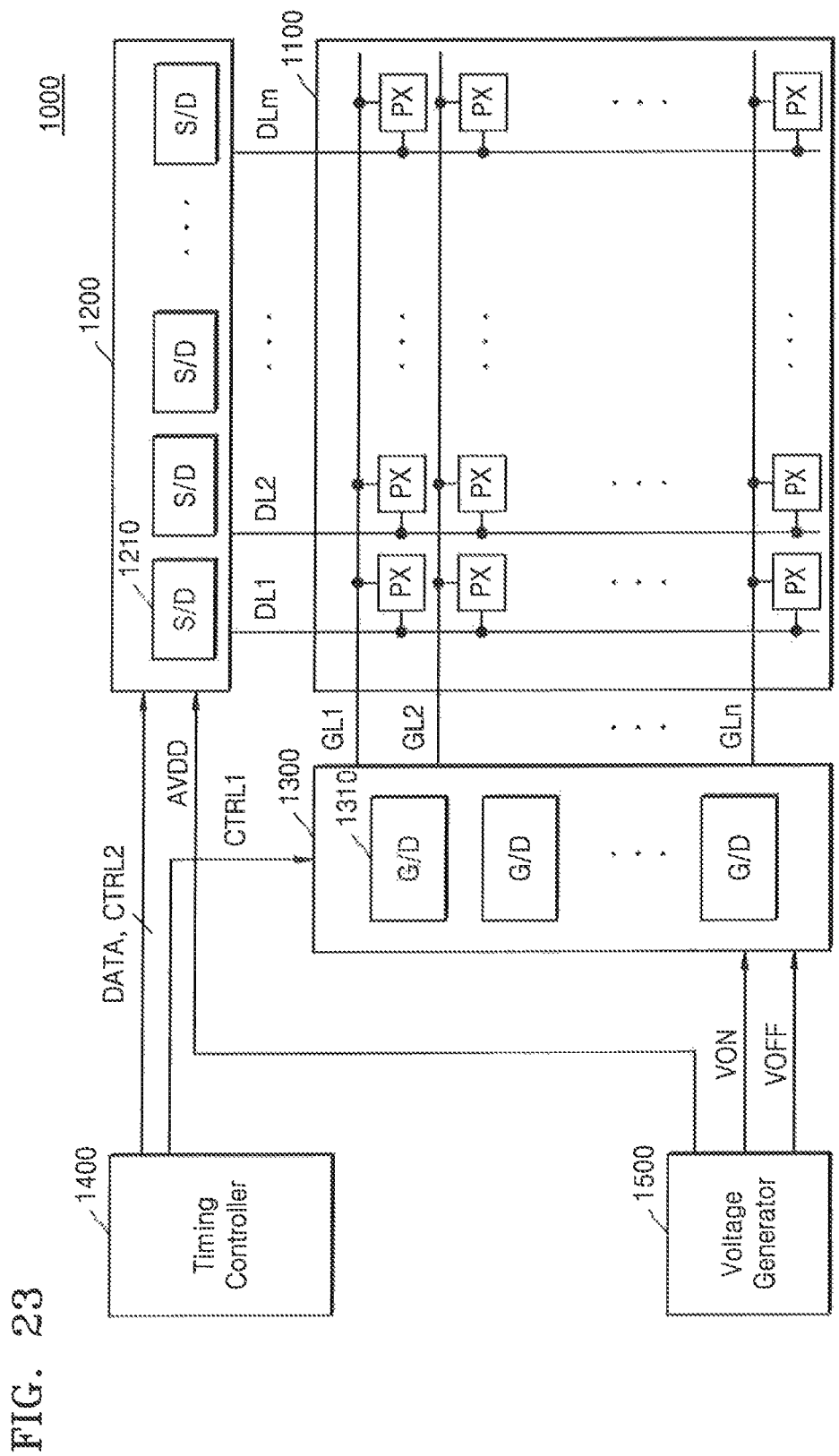
FIG. 23 is a block diagram of a display device including a display driving circuit according to an exemplary embodiment of the inventive concept.

FIG. 23 is a block diagram of a display device 1000 including a display driving circuit according to an exemplary embodiment of the inventive concept.

Referring to FIG. 23, the display device 1000 includes a display panel 1100 for displaying an image and a display driving circuit for driving the display panel 1100. The display driving circuit includes a source driver unit 1200 for driving first to m-th data lines DL1 to DLm of the display panel 1100, a gate driver unit 1300 for driving first to n-th gate lines GL1 to GLn of the display panel 1100, a timing controller 1400 for generating various timing signals and data DATA, CTRL2, and CTRL1. The display device 1000 may further include a voltage generator 1500 for generating various voltages VON, VOFF, and AVDD that may be used for display driving.

The display device 1000 may be applied to any one of various flat panel display devices. For example, a flat panel display device may include a liquid crystal display (LCD), an organic light-emitting diode (OLED) display, a plasma display panel (PDP), and the like, and the display device 1000 according to the current embodiment may be applied to any one of the flat panel display devices. For convenience of description, hereinafter, an LCD device will be described as an example.

The display panel 1100 includes the first to nth gate lines GL1 to GLn, the first to mth data lines DL1 to DLm arranged in a direction crossing the first to nth gate lines GL1 to GLn, and pixels PX. When the display device 1000 is an LCD device, each pixel PX may include a transistor having a gate and a source respectively connected to a gate line and a data line, an LCD capacitor connected to a drain of the transistor, and a storage capacitor.

The source driver unit 1200 may include one or more source drivers 1210. For example, when the display panel 1100 has a large size, a plurality of source drivers 1210 may be provided, and one or more data lines may be driven by the source drivers 1210. The gate driver unit 1300 may also include one or more gate drivers 1310, and one or more gate lines may be driven by the gate drivers 1310.

The voltage generator 1500 may receive a power supply voltage VDD from the outside and generate various voltages for an operation of the display device 1000. For example, the voltage generator 1500 may generate a gate-on voltage VON and a gate-off voltage VOFF and output the gate-on voltage VON and the gate-off voltage VOFF to the gate driver unit 1300, and may generate an analog power supply voltage AVDD and output the analog power supply voltage AVDD to the source driver unit 1200.

The timing controller 1400 receives data and control signals from an external device (or an external host processor). For example, data and control signals may include image data IDATA, a horizontal synchronization signal HSYNC, a vertical synchronization signal VSYNC, a clock signal MCLK, a data enable signal DE, and the like. The timing controller 1400 generates display data DATA of which a protocol has been converted so as to meet the interface specification with the source driver unit 1200 and outputs the display data DATA to the source driver 1200. In addition, the timing controller 1400 may generate various control signals CTRL1 and CTRL2 for controlling timing of the source driver unit 1200 and the gate driver unit 1300, output one or more first control signals CTRL1 to the gate driver unit 1300, and output one or more second control signals CTRL2 to the source driver unit 1200.

The display data DATA and the one or more second control signals CTRL2, output from the timing controller 1400, may be provided to the source driver unit 1200 through a data transmission channel. Although FIG. 23 shows only one line between the timing controller 1400 and the source driver unit 1200, the display data DATA and the one or more second control signals CTRL2, output from the timing controller 1400, may be actually provided to each of the source drivers 1210 through a plurality of data transmission channels. The lengths of the data transmission channels that transmit signals between the timing controller 1400 and the source drivers 1210 may be different from each other. When a panel size of the display panel 1100 is relatively large, the lengths of the data transmission channels may increase, and thus, a transmission error may occur due to signal distortion during signal transmission. In order to prevent the transmission error, each of the source drivers 1210 may perform DC training and AC training according to impedance and frequency characteristics of a data transmission channel corresponding to the source driver. In this case, the source drivers 1210 may perform DC training and AC training when performing full initialization and perform AC training when performing partial initialization. By selectively performing partial initialization or full initialization based on the number of initializations or the number of abnormal state occurrences of the source drivers 1210, a time that is required for initialization may be minimized and the receiving efficiency of the source drivers 1210 may be improved.

Figure 24:
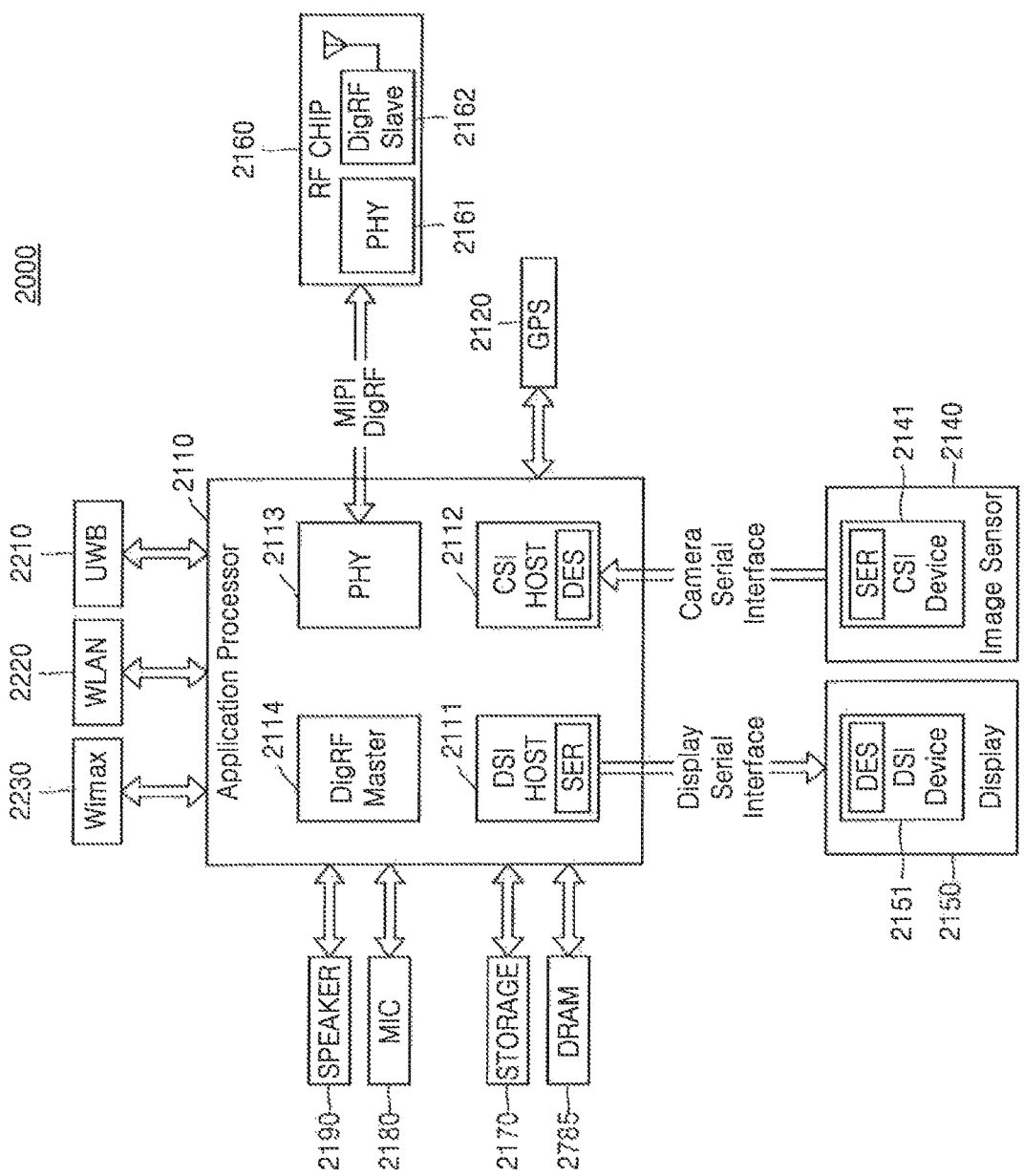
FIG. 24 is a block diagram of an electronic system including a display device according to an exemplary embodiment of the inventive concept.

FIG. 24 is a block diagram of an electronic system 2000 including a display device according to an exemplary embodiment of the inventive concept.

Referring to FIG. 24, the electronic system 2000 may be implemented as a mobile phone, a personal digital assistant (PDA), a portable multimedia player (PMP), or a smart phone.

The electronic system 2000 includes an application processor 2110 and a display device 2150. A display serial interface (DSI) host 2111 implemented in the application processor 2110 may serially communicate with a DSI device 2151 of the display device 2150 through a DSI.

The host processor 410 and the timing controller 420 of FIG. 22 may be applied to the DSI host 2111 and the DSI device 1151, respectively. During data transmission and reception between the DSI host 2111 and the DSI device 2151, the DSI device 2151 may perform initialization when an abnormal state occurs or periodically. In this case, the DSI device 2151 may selectively perform partial initialization or full initialization. By selectively performing partial initialization or full initialization, a time that is required for initialization may be minimized and the receiving efficiency of the display device 2150 may be improved.

A camera serial interface (CSI) host 2112 implemented in the application processor 2110 may serially communicate with a CSI device 2141 of an image sensor 2140 through a CSI.

The electronic system 2000 may further include a radio frequency (RF) chip 2160 that communicates with the application processor 2110. A physical layer protocol (PHY) 2113 of the electronic system 2000 and a PHY 2161 of the RF chip 2160 may send data to each other and receive data from each other, according to a MIPI DigRF interface.

The electronic system 2000 may further include a global positioning system (GPS) 2120, a storage 2170, a microphone 2180, a dynamic random access memory (DRAM) 2785, and a speaker 2190 and may communicate by using a Wimax 2230, a wireless local area network (WLAN) 2220, and an ultra wideband (UWB) 2210.

While the inventive concept has been particularly shown and described with reference to embodiments thereof, it will be understood that various changes in form and details may be made therein without departing from the spirit and scope of the inventive concept.

What is claimed is:

1. A method of operating a receiver, the method comprising:
   determining, by a controller of the receiver, whether a full initialization or a partial initialization of the receiver is needed;
   adjusting, by the controller, alternating current (AC) characteristics and direct current (DC) characteristics of the receiver in a full initialization mode when the controller determines the full initialization is needed; and
   adjusting, by the controller, the AC characteristics of the receiver in a partial initialization mode when the controller determines the partial initialization is needed,
   wherein the adjusting of the AC characteristics comprises adjusting an equalization coefficient of an equalizer that is located in the receiver or causing a clock data recovery circuit of the receiver to enter a lock state.

2. The method of claim 1, wherein the controller determines whether the full or partial initialization is needed according to a number of abnormal state occurrences of the receiver.

3. The method of claim 2, wherein the controller determines the partial initialization is needed when the number of abnormal state occurrences of the receiver is less than or equal to a threshold value, and determines the full initialization is needed when the number of abnormal state occurrences of the receiver is greater than the threshold value.

4. The method of claim 2, Wherein the controller determines the full initialization is needed when the number of abnormal state occurrences of the receiver is greater than a threshold value during a preset time period.

5. The method of claim 2, each of the abnormal state occurrences of the receiver indicates that the receiver is incapable of receiving a signal from a transmitter or incapable of processing the signal received from the transmitter.

6. The method of claim 1, wherein the controller determines the partial initialization is needed when an abnormal state of the receiver occurs and an initialization control signal received from a transmitter is set to a first level, and determines the full initialization is needed when the abnormal state of the receiver occurs and the initialization control signal is set to a second level.

7. The method of claim 1, further comprising performing initialization in the full initialization mode when power is turned on, wherein the controller determines the partial initialization is needed when a number of abnormal state occurrences of the receiver is less than or equal to a threshold value after the power is turned on, and wherein the controller determines the full initialization is needed when the number of abnormal state occurrences of the receiver is greater than the threshold value after the power is turned on.

8. The method of claim 1, wherein the AC characteristics are adjusted based on a training pattern that is received from an outside source, and the DC characteristics are adjusted locally by changing an internal parameter of the receiver without receiving data from the outside source.

9. The method of claim 1, wherein the adjusting of the DC characteristics comprises matching an input impedance of the receiver to an impedance of a data transmission channel between the receiver and a transmitter or compensating for an output offset of a comparator that is located in the receiver.

10. The method of claim 1, wherein the DC characteristics are adjusted during a first period and the AC characteristics are adjusted during a second period, and the first period is longer than the second period.

11. A method of operating a transmitter, the method comprising:
    counting, by the transmitter, a number of abnormal state occurrences that occur within a receiver based on at least one state signal received from the receiver, to generate a count;
    outputting, by the transmitter, a first initialization control signal set to a first level to the receiver when the count is below a threshold; and
    outputting, by the transmitter, a second initialization control signal set to a second level to the receiver when the count is greater than the threshold,
    wherein a controller of the receiver adjusts only alternating current (AC) characteristics of the receiver in response to the first initialization control signal, and adjusts both the AC characteristics and direct current (DC) characteristics of the receiver in response to the second initialization control signal.

12. The method of claim 11, further comprising outputting data from the transmitter to the receiver upon receiving a signal from the receiver indicating initialization has been completed after performing one of the adjustments.

13. The method of claim 11, wherein the at least one state signal indicates that the receiver is incapable of receiving a signal from the transmitter or incapable of processing the signal received from the transmitter.

14. The method of claim 11, further comprising transmitting the second initialization control signal from the transmitter to the receiver upon power being applied to the transmitter.

15. A receiver comprising:
    a controller configured to determine whether a full initialization or a partial initialization of the receiver is needed, adjust alternating current (AC) characteristics and direct current (DC) characteristics of the receiver in a full initialization mode when the controller determines the full initialization is needed, and adjust the AC characteristics of the receiver in a partial initialization mode when the controller determines the partial initialization is needed,
    wherein the adjust of the AC characteristics includes the controller adjusting an equalization coefficient of an equalizer that is located in the receiver or the controller causing a clock data recovery circuit of the receiver to enter a lock state.

16. The receiver of claim 15, wherein the controller determines whether the full or partial initialization is needed according to a number of abnormal state occurrences of the receiver.

17. The receiver of claim 15, wherein the adjust of the DC characteristics includes the controller matching an input impedance of the receiver to an impedance of a data transmission channel between the receiver and a transmitter or the controller compensating for an output offset of a comparator that is located in the receiver.

* * * * *